US012169494B2

(12) United States Patent
Qui et al.

(10) Patent No.: US 12,169,494 B2
(45) Date of Patent: Dec. 17, 2024

(54) SYSTEMS AND METHODS FOR IDENTIFYING EVENTS THAT SHARE A CHARACTERISTIC

(71) Applicant: GOOGLE LLC, Mountain View, CA (US)

(72) Inventors: Lianxiao Qui, Sunnyvale, CA (US); Satvik Chauhan, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 159 days.

(21) Appl. No.: 17/413,532

(22) PCT Filed: Aug. 18, 2020

(86) PCT No.: PCT/US2020/046741
§ 371 (c)(1),
(2) Date: Jun. 11, 2021

(87) PCT Pub. No.: WO2022/039717
PCT Pub. Date: Feb. 24, 2022

(65) Prior Publication Data
US 2022/0318250 A1    Oct. 6, 2022

(51) Int. Cl.
*G06F 16/24*    (2019.01)
*G06F 16/2455*    (2019.01)
*G06F 16/2458*    (2019.01)

(52) U.S. Cl.
CPC .... *G06F 16/24556* (2019.01); *G06F 16/2462* (2019.01)

(58) Field of Classification Search
CPC ...................... G06F 16/24556; G06F 16/2462
See application file for complete search history.

(56) References Cited

U.S. PATENT DOCUMENTS 10,387,487 B1 *    8/2019    Svendsen .............. H04W 4/029
11,366,872 B1 *    6/2022    Bedi ................... G06F 16/9537
(Continued)

FOREIGN PATENT DOCUMENTS

JP    2017-522664 A    8/2017
JP    2020-514877 A    5/2020

OTHER PUBLICATIONS

International Search Report and The Written Opinion of the International Seraching Authority dated Apr. 23, 2021 regarding PCT/US2020/046741.

(Continued)

*Primary Examiner* — Mohammad S Rostami
(74) *Attorney, Agent, or Firm* — MARSHALL, GERSTEIN & BORUN LLP

(57) ABSTRACT

A method including receiving, from a device, interaction data associated with an event including a first identifier, identifying a second identifier associated with the first identifier, identifying one or more previous interactions associated with the first identifier or the second identifier, annotating the interaction data based on the identified one or more previous interactions, wherein the annotation indicates a preference for previous interactions associated with the first identifier or previous interactions associated with the second identifier, and transmitting an indication that the event is associated with one or more of the previous interactions, wherein the one or more previous interactions are determined based on the preference indicated by the annotation.

16 Claims, 8 Drawing Sheets

(56) References Cited

U.S. PATENT DOCUMENTS

| | | | |
|---|---|---|---|
| 11,368,420 B1* | 6/2022 | Crook | G06F 8/31 |
| 2014/0040786 A1* | 2/2014 | Swanson | G06F 16/957 |
| | | | 715/760 |
| 2015/0082326 A1* | 3/2015 | Milliron | G06F 11/3089 |
| | | | 719/318 |
| 2015/0304437 A1* | 10/2015 | Vaccari | H04L 67/10 |
| | | | 709/204 |
| 2015/0373089 A1 | 12/2015 | Koss et al. | |
| 2016/0085815 A1* | 3/2016 | Tsuchiya | G06F 16/335 |
| | | | 707/738 |
| 2016/0171016 A1* | 6/2016 | Chang | G06F 16/58 |
| | | | 707/746 |
| 2016/0255139 A1* | 9/2016 | Rathod | H04N 1/32101 |
| | | | 709/203 |
| 2017/0315917 A1* | 11/2017 | Yamamoto | G06F 12/0862 |
| 2018/0103112 A1 | 4/2018 | Jones-McFadden et al. | |
| 2018/0165349 A1* | 6/2018 | Vaughan | G06F 7/08 |
| 2018/0246983 A1* | 8/2018 | Rathod | G06F 16/972 |
| 2018/0260442 A1 | 9/2018 | Vishnuvardhan | |
| 2018/0285370 A1* | 10/2018 | Bhagwat | G06F 16/122 |
| 2018/0316546 A1* | 11/2018 | Elmquist | H04L 41/064 |
| 2019/0028557 A1* | 1/2019 | Modi | G06F 21/316 |
| 2019/0065615 A1* | 2/2019 | Room | G06F 16/954 |
| 2019/0087828 A1* | 3/2019 | Coughlin | G06Q 10/063114 |
| 2019/0205474 A1* | 7/2019 | Pawar | G06F 40/205 |
| 2019/0205481 A1* | 7/2019 | Gutnik | G06Q 50/01 |
| 2019/0289367 A1* | 9/2019 | Siddiq | H04N 21/485 |
| 2021/0006574 A1* | 1/2021 | Venter | G06F 11/3006 |
| 2021/0011967 A1* | 1/2021 | Rathod | G06F 16/9535 |
| 2021/0232478 A1* | 7/2021 | M Y | G06F 16/906 |
| 2021/0319668 A1* | 10/2021 | Huke | G06N 20/00 |
| 2021/0342836 A1* | 11/2021 | Cella | H04L 9/3239 |

OTHER PUBLICATIONS

Office Action for Korean Patent Application No. 10-2021-7022221, dated Jan. 5, 2023.

Office Action, Japanese Patent Application No. 2021-541107, dated Nov. 29, 2022.

* cited by examiner

SYSTEMS AND METHODS FOR IDENTIFYING EVENTS THAT SHARE A CHARACTERISTIC

CROSS-REFERENCE TO RELATED APPLICATIONS

The present application is a National Stage Application, filed under 35 U.S.C. 371, of International Patent Application No. PCT/US2020/046741 filed on Aug. 18, 2020 titled "SYSTEMS AND METHODS FOR IDENTIFYING EVENTS THAT SHARE A CHARACTERISTIC," the entirety of which is incorporated by reference herein.

BACKGROUND

It can be helpful for analytics systems to be able to determine associations between events, such as events across client devices (e.g., an association between a first interaction with a first content item on a first device and a second interaction with a second content item on a second device). To do so, identifiers from various interactions can be compared to determine associations. For example, an interaction having a first identifier may be determined to be associated with a previous interaction also having the first identifier. However, interactions may be identified with a number of disparate identifiers leading to duplication in associations between interactions. For example, a system may search for interactions matching a first or second identifier of a first interaction and may identify a second interaction twice because the second interaction is associated with the first and second identifier, thereby leading to a duplication.

SUMMARY

One implementation of the disclosure relates to a method including receiving, from a device, interaction data associated with an event including a first identifier, identifying a second identifier associated with the first identifier, identifying one or more previous interactions associated with the first identifier or the second identifier, annotating the interaction data based on the identified one or more previous interactions, wherein the annotation indicates a preference for previous interactions associated with the first identifier or previous interactions associated with the second identifier, and transmitting an indication that the event is associated with one or more of the previous interactions, wherein the one or more previous interactions are determined based on the preference indicated by the annotation.

In some implementations, at least two of the one or more previous interactions are associated with a single previous event, wherein a first of the at least two previous interactions is associated with the first identifier and a second of the at least two previous interactions is associated with the second identifier, and wherein the first and second of the at least two previous interactions are associated with a second device. In some implementations, the method further includes identifying one or more other identifiers associated with the first identifier, wherein identifying the one or more previous interactions associated with the first identifier or the second identifier further includes identifying one or more previous interactions associated with the first identifier, the second identifier, or one of the one or more other identifiers, and wherein the annotation indicates a preference for previous interactions associated with the first identifier, the second identifier, or one of the one or more other identifiers. In some implementations, annotating the interaction data includes determining whether the one or more previous interactions includes an interaction associated with the first identifier, in response to determining that the one or more previous interactions includes an interaction associated with the first identifier, annotating the interaction data to prefer previous interactions associated with the first identifier, in response to determining that the one or more previous interactions does not include an interaction associated with the first identifier, determining whether the one or more previous interactions includes an interaction associated with the second identifier, and in response to determining that the one or more previous interactions includes an interaction associated with the second identifier, annotating the interaction data to prefer previous interactions associated with the second identifier.

In some implementations, the method further includes analyzing previous interactions to identify the previous interaction associated with the event, wherein the previous interaction includes an identifier indicated by the annotation. In some implementations, the previous interaction is associated with a first device and wherein the event is associated with a second device. In some implementations, the method further includes storing the interaction data and annotation in computer storage, wherein future analysis of previous interactions associated with the first or second identifier reduce a search space by limiting analysis to interactions associated with the identifier indicated by the annotation. In some implementations, the first identifier is associated with the device and the second identifier is associated with an account. In some implementations, interaction data annotated with a preference for previous interactions associated with the first identifier cannot be associated with previous interactions having the second identifier and wherein interaction data annotated with a preference for previous interactions associated with the second identifier cannot be associated with previous interactions having the first identifier. In some implementations, the method further includes analyzing the previous interactions using the annotation to determine aggregate statistics associated with the event, wherein the aggregate statistics include a count of the previous interactions sharing a characteristic with the event.

Another implementation of the disclose relates to a system for identifying events that share a characteristic, the system including one or more processing circuits including one or more processors and one or more memories, the one or more memories having instructions stored thereon that, when executed by the one or more processors, cause the one or more processing circuits to receive, from a device, interaction data associated with an event including a first identifier, identify a second identifier associated with the first identifier, identify one or more previous interactions associated with the first identifier or the second identifier, annotate the interaction data based on the identified one or more previous interactions, wherein the annotation indicates a preference for previous interactions associated with the first identifier or previous interactions associated with the second identifier, and transmit an indication that the event is associated with one or more of the previous interactions, wherein the one or more previous interactions are determined based on the preference indicated by the annotation.

In some implementations, at least two of the one or more previous interactions are associated with a single previous event, wherein a first of the at least two previous interactions is associated with the first identifier and a second of the at least two previous interactions is associated with the second identifier, and wherein the first and second of the at least two previous interactions are associated with a second device. In some implementations, the system is further configured to identify one or more other identifiers associated with the first identifier, and wherein identifying the one or more previous interactions associated with the first identifier or the second identifier further includes identifying one or more previous interactions associated with the first identifier, the second identifier, or one of the one or more other identifiers, and wherein the annotation indicates a preference for previous interactions associated with the first identifier, the second identifier, or one of the one or more other identifiers. In some implementations, annotating the interaction data includes determining whether the one or more previous interactions includes an interaction associated with the first identifier, in response to determining that the one or more previous interactions includes an interaction associated with the first identifier, annotating the interaction data to prefer previous interactions associated with the first identifier, in response to determining that the one or more previous interactions does not include an interaction associated with the first identifier, determining whether the one or more previous interactions includes an interaction associated with the second identifier, and in response to determining that the one or more previous interactions includes an interaction associated with the second identifier, annotating the interaction data to prefer previous interactions associated with the second identifier.

In some implementations, the system is further configured to analyze previous interactions to identify the previous interaction associated with the event, wherein the previous interaction includes an identifier indicated by the annotation. In some implementations, the previous interaction is associated with a first device and wherein the event is associated with a second device. In some implementations, the system is further configured to store the interaction data and annotation in computer storage, wherein future analysis of previous interactions associated with the first or second identifier reduce a search space by limiting analysis to interactions associated with the identifier indicated by the annotation. In some implementations, the first identifier is associated with the device and the second identifier is associated with an account. In some implementations, interaction data annotated with a preference for previous interactions associated with the first identifier cannot be associated with previous interactions having the second identifier and wherein interaction data annotated with a preference for previous interactions associated with the second identifier cannot be associated with previous interactions having the first identifier. In some implementations, the system is further configured to analyze the previous interactions using the annotation to determine aggregate statistics associated with the event, wherein the aggregate statistics include a count of the previous interactions sharing a characteristic with the event.

Another implementation of the disclosure relates to one or more non-transitory computer-readable media having instructions stored thereon that, when executed by one or more processors, cause the one or more processors to receive, from a device, interaction data associated with an event including a first identifier, identify a second identifier associated with the first identifier, identify one or more previous interactions associated with the first identifier or the second identifier, annotate the interaction data based on the identified one or more previous interactions, wherein the annotation indicates a preference for previous interactions associated with the first identifier or previous interactions associated with the second identifier, and transmit an indication that the event is associated with one or more of the previous interactions, wherein the one or more previous interactions are determined based on the preference indicated by the annotation.

In some implementations, at least two of the one or more previous interactions are associated with a single previous event, wherein a first of the at least two previous interactions is associated with the first identifier and a second of the at least two previous interactions is associated with the second identifier, and wherein the first and second of the at least two previous interactions are associated with a second device. In some implementations, the instructions are further configured to identify one or more other identifiers associated with the first identifier, wherein identifying the one or more previous interactions associated with the first identifier or the second identifier further includes identifying one or more previous interactions associated with the first identifier, the second identifier, or one of the one or more other identifiers, and wherein the annotation indicates a preference for previous interactions associated with the first identifier, the second identifier, or one of the one or more other identifiers. In some implementations, annotating the interaction data includes determining whether the one or more previous interactions includes an interaction associated with the first identifier, in response to determining that the one or more previous interactions includes an interaction associated with the first identifier, annotating the interaction data to prefer previous interactions associated with the first identifier, in response to determining that the one or more previous interactions does not include an interaction associated with the first identifier, determining whether the one or more previous interactions includes an interaction associated with the second identifier, and in response to determining that the one or more previous interactions includes an interaction associated with the second identifier, annotating the interaction data to prefer previous interactions associated with the second identifier.

In some implementations, the instructions are further configured to analyze previous interactions to identify the previous interaction associated with the event, wherein the previous interaction includes an identifier indicated by the annotation. In some implementations, the previous interaction is associated with a first device and wherein the event is associated with a second device. In some implementations, the instructions are further configured to store the interaction data and annotation in computer storage, wherein future analysis of previous interactions associated with the first or second identifier reduce a search space by limiting analysis to interactions associated with the identifier indicated by the annotation. In some implementations, the first identifier is associated with the device and the second identifier is associated with an account. In some implementations, interaction data annotated with a preference for previous interactions associated with the first identifier cannot be associated with previous interactions having the second identifier and wherein interaction data annotated with a preference for previous interactions associated with the second identifier cannot be associated with previous interactions having the first identifier. In some implementations, the instructions are further configured to analyze the previous interactions using the annotation to determine aggregate statistics associated with the event, wherein the aggregate statistics include a count of the previous interactions sharing a characteristic with the event.

The various aspects and implementations may be combined where appropriate.

DETAILED DESCRIPTION

Figure 1A:
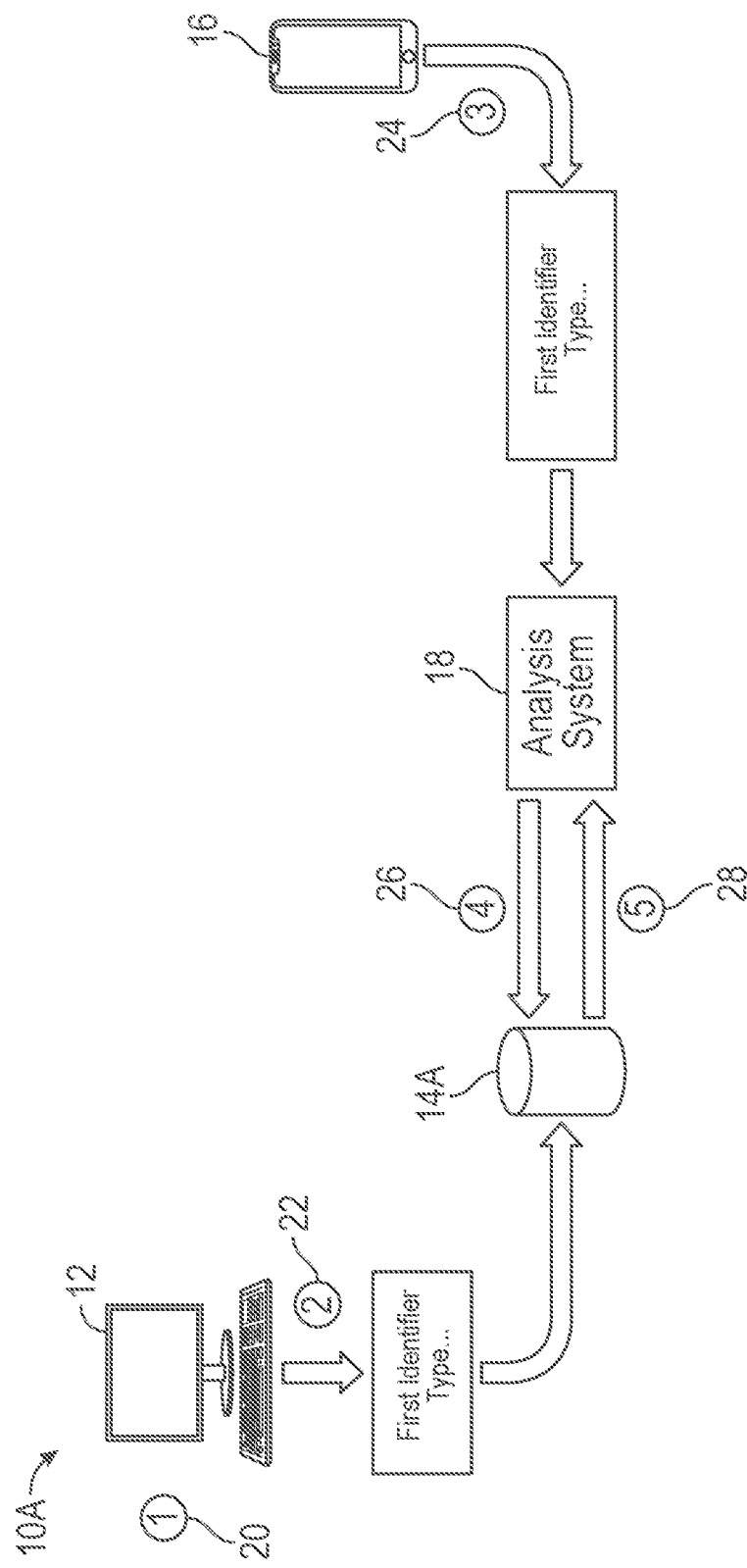
FIG. 1A is a diagram illustrating a system that may be unable to determine associations between events from different devices, according to an illustrative implementation.

Following below are more detailed descriptions of various concepts related to, and implementations of, methods, apparatuses, and systems for identifying events that share a characteristic. The various concepts introduced above and discussed in greater detail below may be implemented in any of numerous ways, as the described concepts are not limited to any particular manner of implementation.

In many domains, it may be desirable to measure interactions with various devices, such as mobile devices. For example, a mobile application developer may wish to know a sequence of actions that led to a conversion on a mobile application. As an additional example, a developer may wish to know a sequence of actions that led to an application malfunction (e.g., a crash, etc.). In various implementations, measuring interactions with mobile devices includes determining associations between events across devices. For example, it may be desirable to determine an association between an interaction with a content item on a first device and a subsequent conversion on a second device.

Systems and methods of the present disclosure relate generally to determining associations between events, including, but not limited to, events across devices. More specifically, systems and methods of the present disclosure relate to unique computer architecture methodologies to deduplicate event data and accurately determine interaction measurements.

Determining interaction measurements includes collecting interaction data (e.g., data associated with an event) and correlating the interaction data with previous interaction data. For example, a mobile device may send an indication when a user interacts with a first content item and then downloads a new mobile application and an analysis system may correlate the download to the user interaction with the first content item. Interaction data may be transmitted with an identifier to facilitate correlation with previous interactions. For example, interaction data generated by a first mobile application may be associated with previous interactions using an identifier (e.g., a shared identifier, etc.). However, interactions from different devices may have different identifiers. Therefore, correlating interactions across devices may be difficult. For example, a user using a first device may interact with a content item causing the first device to generate first interaction data having a first identifier (e.g., a device identifier) and the same user using a second device may complete a transaction associated with the content item causing the second device to generate second interaction data having a second identifier (e.g., a device identifier) and an analysis system may be unable to correlate the transaction with the interaction because of the difference between the first identifier and the second identifier.

Therefore, there is a need for a system to facilitate correlation of interaction data, such as interaction data across devices. One solution utilizes a second type of identifier (e.g., an account identifier) that may be associated with the first type of identifier (e.g., a device identifier). For example, a first device may generate first interaction data having a first, type of identifier (e.g., a device identifier), a second device may generate second interaction data having a second type of identifier (e.g., an account identifier), and an analysis system may look up the first identifier using the second identifier, and may correlate the second interaction with the first interaction using the association between the first type of identifier (e.g., the device identifier) and the second type of identifier (e.g., the account identifier). In various implementations, devices generate interaction data using available identifiers. For example, a first device having a logged-in account may generate interaction data having a first type of identifier (e.g., a device identifier) and a second type of identifier (e.g., an account identifier) while a second device not having a logged-in account may generate interaction data having a first type of identifier (e.g., a device identifier). In various implementations, a copy of the interaction data having the first type of identifier is stored separately from a copy of the interaction data having the second type of identifier. However, because a previous interaction may be represented using multiple identifiers and/or multiple types of identifiers (e.g., a device identifier and an account identifier, etc.), it is possible to identify duplicate copies of the previous interaction when searching for previous interactions associated with an event. For example, a user may complete a conversion on a mobile device, the mobile device may send interaction data having two types of identifiers to an analysis system, the analysis system may search a database (or multiple databases) for previous interactions having at least one of the two types of identifiers, and may identify a single previous interaction twice, once for each of the two types of identifiers, thereby over-reporting the number of correlated previous interactions. Therefore, to retain the ability to accurately correlate mobile device interactions with previous interactions, a new architecture for deduplicating interaction measurements from mobile devices is needed.

Turning now to FIG. 1A, a typical system 10A for attributing interactions from a single device is shown, according to an illustrative implementation. In various implementations, system 10A is unable to correlate interactions across devices. For example, at step 20 first computing device 12 may detect a first event. The first event may include an interaction with a content item. At step 22, first computing device 12 may generate interaction data including a first type of identifier (e.g., a device identifier) and may send the interaction data to first database 14A for storage. At step 24, second computing device 16 may generate and transmit interaction data including the first type of identifier a device identifier) associated with a second event to analysis system 18 for attribution. In various implementations, the specific identifier associated with the first type of identifier from the first computing device 12 is different than the specific identifier associated with the first type of identifier from the second computing device 16. For example, first computing device 12 and second computing device 16 may both generate interaction data including a device identifier, however the device identifier associated with first computing device 12 may be different than the device identifier associated with the second computing device 16. In various implementations, the second event is correlated with the first event. At step 26, analysis system 18 may search first database 14A for previous interactions associated with the second event. In various implementations, step 26 includes searching first database 14A using the identifier from the second computing device 16. At step 28, first database 14A may return results to analysis system 18. In various implementations, the results do not include any previous interactions associated with first computing device 12 (e.g., because the device identifier from the second computing device 16 is different than the device identifier from the first computing device 12 and therefore the identifier from the second computing device 16 cannot be used to find previous interactions associated with the identifier from the first computing device 12). Therefore, system 10A may be unable to correlate interactions across devices.

Figure 1B:
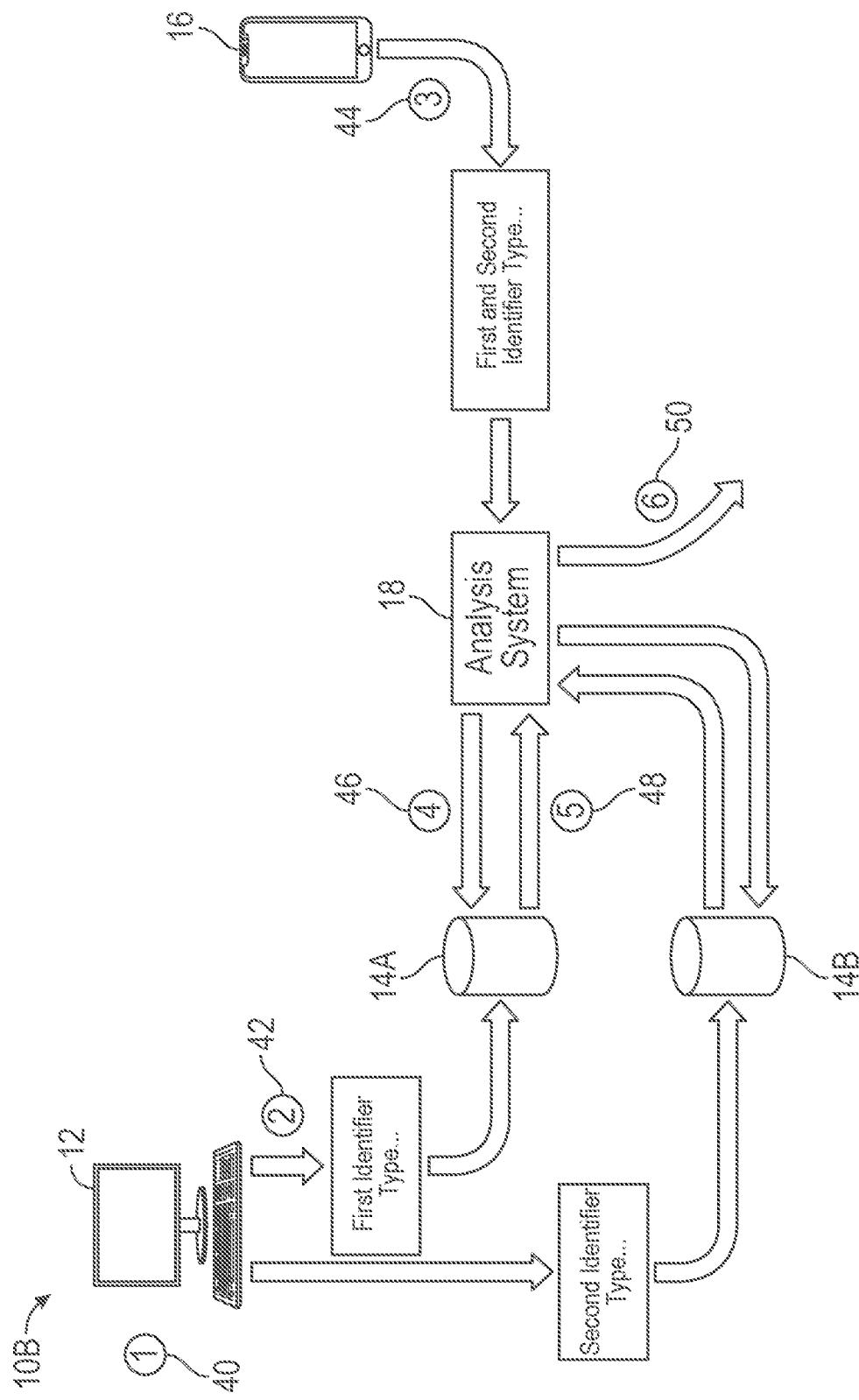
FIG. 1B illustrates a modification of the system of FIG. 1A that is able to determine associations between events from different devices but may duplicate results, according to an illustrative implementation.

To facilitate cross-device correlation of interactions, system 10A may be modified to include another type of identifier (e.g., an account identifier). Referring to FIG. 1B, system 10B may be a modified version of system 10A configured to correlate interactions across devices. At step 40, first computing device 12 may detect a first event. The first event may include an interaction with a content item. At step 42, first computing device 12 may generate interaction data including a first type of identifier (e.g., a device identifier) and a second type of identifier (e.g., an account identifier) and may send the interaction data to first database 14A and second database 14B for storage. In various implementations, first computing device 12 generates two copies of the interaction data, a first copy including the first type of identifier and a second copy including the second type of identifier. The first and second copies may be stored separately of each other, in some implementations. For example, the first copy may be stored in first database 14A and the second copy may be stored in second database 14B. At step 44, second computing device 16 may generate and transmit interaction data including a first type of identifier (e.g., a device identifier) and a second type of identifier (e.g., an account identifier) associated with a second event to analysis system 18 for attribution. In various implementations, the second event is correlated with the first event. At step 46, analysis system 18 may search first database 14A and second database 14B for previous interactions associated with the second event. In various implementations, step 46 includes searching first database 14A using the first type of identifier and searching second database 14B using the second type of identifier. At step 48, first database 14A and second database 14B may return results to analysis system 18. First database 14A may be unable to return a previous interaction from first computing device 12 associated with the second event (e.g., because the identifier of the first type from first computing device 12 is different than the identifier of the first type from second computing device 16). However, second database 14B may be able to return a previous interaction from first computing device 12 associated with the second event (e.g., because the identifier of the second type from the first computing device 12 is the same as the identifier of the second type from the second computing device 16). Therefore, system 10B may improve upon system 10A by facilitating cross-device correlation of interactions. However, system 10B may duplicate correlation results. For example, using second computing device 16, a user may have previously viewed a content item associated with the second event, thereby causing interaction data associated with the view to be stored in first database 14A and second database 14B (e.g., by a similar process as the interaction data from the first event was stored in steps 40-42). Therefore, during step 48, analysis system may receive duplicate copies of the interaction data associated with the view (e.g., a first copy including the first type of identifier and a second copy including the second type of identifier). As a result, at step 50, analysis system 18 may incorrectly report the analysis results (e.g., over reporting the number of correlated previous interactions, falsely identifying duplicate previous interactions, etc.). Therefore, there is a need for a system to deduplicate event data and accurately determine interaction measurements.

Aspects of the present disclosure provide improved data reporting and analysis pathways and computer architectures. The pathways and architectures may be used to analyze and report mobile device event data in a robust and accurate manner.

To facilitate deduplicated cross-device interaction measurements, systems and methods of the present disclosure introduce an analysis and deduplication system that facilitates annotation of event data. The term annotation of x or annotating x as used herein may be interpreted as meaning adding meta-data to x. A non-limiting example implementation is as follows: a user using a first device (e.g., a desktop computer, etc.) may view a first content item. A first computing system may register that the user viewed the first content item and save a first copy of the first interaction data in a first database with a first type of identifier and a second copy of the first interaction data in a second database with a second type of identifier. The user using a mobile device may then interact with a second content item, thereby causing the mobile device to transmit event data associated with the second interaction to the analysis and deduplication system. The event data may include the first type of identifier (e.g., a device identifier) and the second type of identifier (e.g., an account identifier). The analysis and deduplication system may search for previous interactions having the first type of identifier or the second type of identifier and may annotate the event data based on the results. For example, the analysis and deduplication system may annotate the event data as eligible for a conversion associated with the first type of identifier and as not eligible for a conversion associated with the second type of identifier in response to identifying an interaction in the first database having the first type of identifier. The analysis and deduplication system may analyze previous interaction data to identify previous interactions associated with the event data while filtering the previous interactions based on the annotation to determine a deduplicated result.

Figure 2:
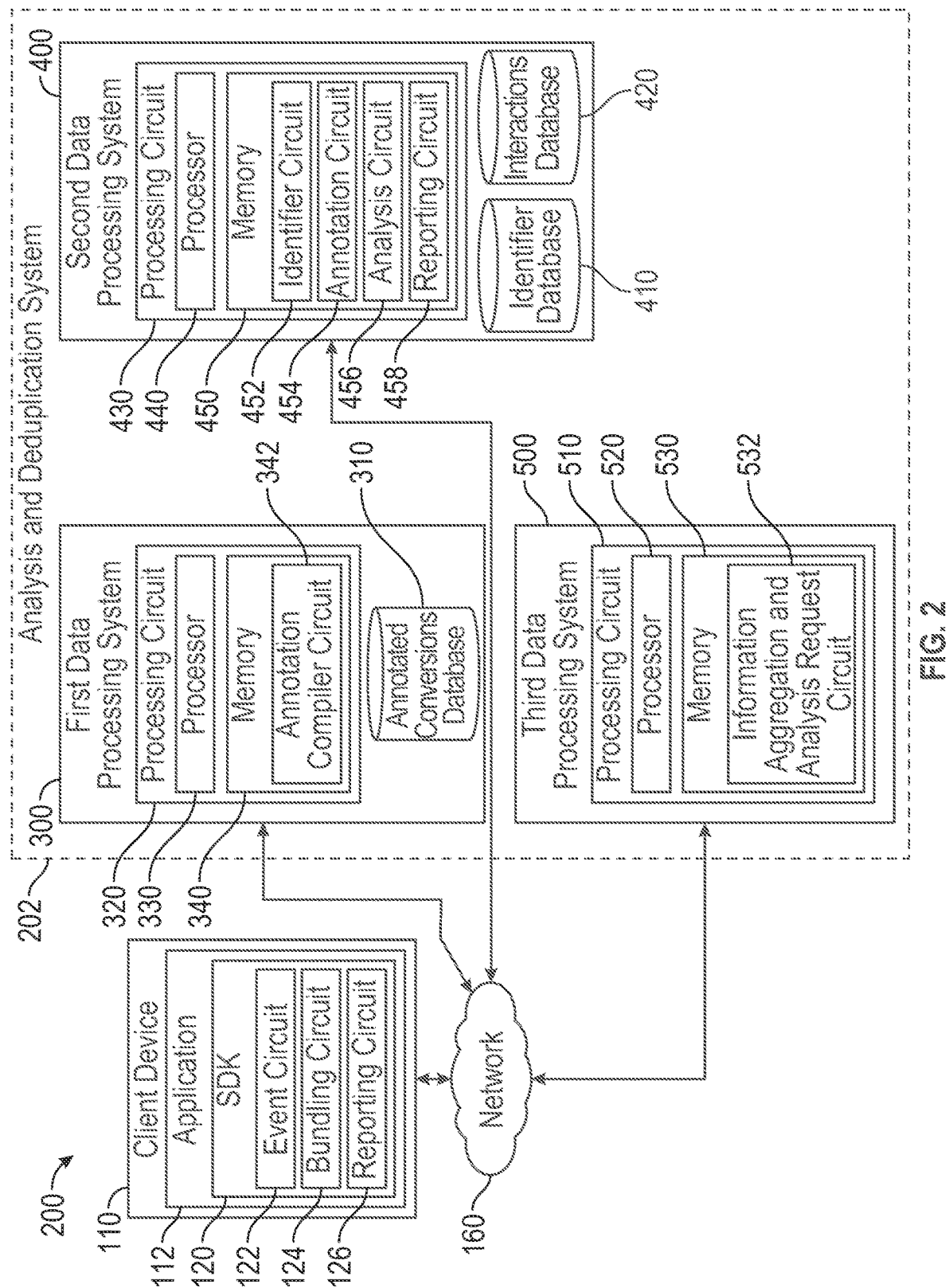
FIG. 2 is a diagram illustrating various entities interacting over a network, according to an illustrative implementation.

Referring now to FIG. 2, a system 200 for collecting and analyzing event data from mobile devices is shown, according to an illustrative implementation. System 200 includes client device 110 and analysis and deduplication system 202 having first data processing system 300, second data processing system 400, and third data processing system 500. In various implementations, components of system 200 communicate over network 160. Network 160 may include computer networks such as the Internet, local, wide, metro or other area networks, intranets, satellite networks, other computer networks such as voice or data mobile phone communication networks, combinations thereof, or any other type of electronic communications network. Network 160 may include or constitute a display network (e.g., a subset of information resources available on the Internet that are associated with a content placement or search engine results system, or that are eligible to include third party content items as part of a content item placement campaign). In various implementations, network 160 facilitates secure communication between components of system 200. As a non-limiting example, network 160 may implement transport layer security (TLS), secure sockets layer (SSL), hypertext transfer protocol secure (HTTPS), and/or any other secure communication protocol.

Client device 110 may be a mobile computing device, smartphone, tablet, or any other device configured to facilitate receiving, displaying, and interacting with content (e.g., web pages, mobile applications, etc.). Client device 110 may include application 112 to receive and display online content and to receive user interaction with the online content. For example, application 112 may be a web browser. Additionally or alternatively, application 112 may be a mobile application associated with a specific merchant.

In various implementations, application 112 interacts with a content publisher to receive online content. For example, application 112 may receive an information resource from a content publisher. The information resources may include web-based content items such as a web page or other online documents. The information resources may include instructions (e.g., scripts, executable code, etc.) that when interpreted by application 112 cause application 112 to display a graphical user interface such as an interactive web page to a user.

Application 112 is shown to include software development kit 120 having event circuit 122, bundling circuit 124, and reporting circuit 126. Software development kit (SDK) 120 may include a collection of software development tools contained in a package. SDK 120 may include an application programming interface (API). In some implementations, SDK 120 includes one or more libraries having reusable functions that interface with a particular system software (e.g., iOS, Android, etc.). SDK 120 may facilitate embedding functionality in application 112, For example, a developer may use SDK 120 to automatically transmit event data whenever an event of a specific type occurs on application 112. As a further example, SDK 120 may include a reusable function configured to collect and report device analytics and a developer may insert the reusable function into the instructions of application 112 to cause the reusable function to be called during specific actions of application 112. In some implementations, event circuit 122, bundling circuit 124, and/or reporting circuit 126 are functionalities provided by SDK 120 (e.g., reusable functions, etc.).

Event circuit 122 may detect events within application 112. In various implementations, event circuit 122 may be configured to trigger other functionality based on detecting specific events (e.g., conversions, transactions, in-app purchases, achieving a certain level in an in-app game, performing a certain number of actions, spending a certain amount of time interacting with an application, etc.). For example, event circuit 122 may trigger bundling circuit 124 upon detecting an event within application 112. In various implementations, SDK 120 includes a function that is embedded in application 112 to trigger event circuit 122. For example, a developer may include a function of SDK 120 in a transaction confirmation functionality of application 112 that causes event circuit 122 to detect a confirmed transaction. It should be understood that events may include any action important to a developer within an application and are not limited to the examples expressly contemplated herein. In various implementations, event circuit 122 is configured to differentiate between different types of events. For example, event circuit 122 may trigger a first set of actions based on a first type of detected event and may trigger a second set of actions based on a second type of detected event. In various implementations, event circuit 122 is configured to collect event data associated with the detected event and transmit the collected event data to bundling circuit 124.

Bundling circuit 124 may bundle (e.g., aggregate, etc.) event data. In various implementations, bundling circuit 124 receives event data associated with a detected event from event circuit 122. Bundling circuit 124 may collect event data from one or more events and bundle the event data for transmission. For example, bundling circuit 124 may collect event data from ten events and combine the event data into a single bundle. Event data may include version information (e.g., a version of application 112 and/or SDK 120, etc.), one or more identifiers, and/or a type. Additionally or alternatively, event data may include other information such as a timestamp of the event, a name of the event, and/or parameters of the event (e.g., a purchased item, a price, a currency, discounts, subscription information, etc.). In some implementations, bundling circuit 124 transmits bundles to reporting circuit 126. In various implementations, bundling circuit 124 generates a data bundle (e.g., a collection of event data, etc.). In various implementations, bundling circuit 124 improves the operation of client device 110. For example, bundling circuit 124 may bundle event data from 10 events to reduce the power consumption associated with transmitting each event individually.

Reporting circuit 126 may transmit bundled event data to analysis and deduplication system 202. Additionally or alternatively, reporting circuit 126 may transmit data to a number of destinations in parallel (e.g., first data processing system 300, second data processing system 400, a database, etc.). In some implementations, reporting circuit 126 transmits first data to a first destination and second data to a second destination. For example, reporting circuit 126 may transmit first data to first data processing system 300 and second data to second data processing system 400.

In various implementations, reporting circuit 126 transmits data periodically. For example, reporting circuit 126 may transmit data at a predefined time. As another example, reporting circuit 126 may transmit data on an interval (e.g., every ten minutes, every ten hours, etc.). Additionally or alternatively, reporting circuit 126 may transmit data in response to a threshold. For example, reporting circuit 126 may transmit data in response to bundling circuit 124 receiving event data from a threshold number of events (e.g., ten events, one-hundred events, etc.). In some implementations, reporting circuit 126 transmits data dynamically. For example, reporting circuit 126 may transmit data in response to client device 110 being connected to a charging source. As a further example, reporting circuit 126 may transmit data in response to the transmission bundle reaching a specified data size.

Analysis and deduplication system 202 may correlate event data with previous interactions. In various implementations, analysis and deduplication system 202 deduplicates identifier keyspaces (e.g., different identifier types). For example, analysis and deduplication system 202 may analyze previous interactions to identify duplicate interactions having associated identifiers. In various implementations, analysis and deduplication system 202 annotates event data to facilitate deduplicated correlation of events, for example across devices. In some implementations, analysis and deduplication system 202 facilitates deduplicated correlation of events on a single device. For example, analysis and deduplication system 202 may facilitate deduplicated correlation of a first event on a first application on a first device and a second event on a second application on the first device, wherein the first and second events are associated with different identifiers. Analysis and deduplication system 202 may include first data processing system 300, second data processing system 400, and third data processing system 500. Additionally or alternatively, analysis and deduplication system 202 may include additional and/or fewer components (e.g., just first data processing system 300, etc.). In some implementations, analysis and deduplication system 202 is a distributed system (e.g., cloud processing system, etc.). In some implementations, analysis and deduplication system 202 combines first data processing system 300, second data processing system 400, and third data processing system 500 in a single system (e.g., a single server, etc.).

First data processing system 300 may receive event data from client device 110 (e.g., via SDK 120, etc.), request annotation from second data processing system 400, and save annotations received from second data processing system 400 in memory (e.g., a database, etc.). In some implementations, first data processing system 300 receives a data bundle (e.g., a collection of event data associated with a number of events, etc.) from SDK 120. First data processing system 300 may be a server, distributed processing cluster, cloud processing system, or any other computing device. First data processing system 300 may include or execute at least one computer program or at least one script. In some implementations, first data processing system 300 includes combinations of software and hardware, such as one or more processors configured to execute one or more scripts.

First data processing system 300 is shown to include annotated conversions database 310 and processing circuit 320. Annotated conversions database 310 may store annotated conversions. For example, first data processing system 300 may request an annotation from second data processing system 400 for first interaction data and may store the annotation received from second data processing system 400 in annotated conversions database 310 with conversion information associated with the first interaction data. Additionally or alternatively, annotated conversions database 310 may store any type of desired interaction data/event, such as a purchase of a product or service, provision of requested information (e.g., such as via an online form or response to a communication such as electronic mail), or any other type of interaction. Annotated conversions database 310 may include one or more storage mediums. The storage mediums may include but are not limited to magnetic storage, optical storage, flash storage, and/or RAM. First data processing system 300 may implement or facilitate various APIs to perform database functions (i.e., managing data stored in annotated conversions database 310). The APIs can be but are not limited to SQL, ODBC, JDBC, and/or any other data storage and manipulation API.

Processing circuit 320 may include processor 330 and memory 340. Memory 340 may have instructions stored thereon that, when executed by processor 330, cause processing circuit 320 to perform the various operations described herein. The operations described herein may be implemented using software, hardware, or a combination thereof. Processor 330 may include a microprocessor, ASIC, FPGA, etc., or combinations thereof. In many implementations, processor 330 may be a multi-core processor or an array of processors. Memory 340 may include, but is not limited to, electronic, optical, magnetic, or any other storage devices capable of providing processor 330 with program instructions. Memory 340 may include a floppy disk, CD-ROM, DVD, magnetic disk, memory chip, ROM, RAM, EEPROM, EPROM, flash memory, optical media, or any other suitable memory from which processor 330 can read instructions. The instructions may include code from any suitable computer programming language such as, but not limited to, C, C++, C#, Java, JavaScript, Perl, HTML, XML, Python and Visual Basic.

Memory 340 may include annotation compiler circuit 342. Annotation compiler circuit 342 may receive interaction data from client device 110, extract one or more identifiers from the interaction data, compile supplemental data, and request annotation from second data processing system 400. In various implementations, annotation compiler circuit 342 receives a data bundle from SDK 120 and analyzes contents of the data bundle to identify one or more identifiers associated with one or more events included in the data bundle. For example, annotation compiler circuit 342 may receive a data bundle including an event associated with a first identifier, may identify a second identifier associated with the first identifier, and may transmit the first and second identifiers to second data processing system 400 as part of an annotation request. In various implementations, supplemental data is associated with contents of a data bundle. For example, the supplemental data may be another identifier associated with an event included in the data bundle.

Second data processing system 400 may identify supplemental identifiers, annotate interactions, and determine correlations between events. For example, second data processing system 400 may receive an annotation request associated with a first event from first data processing system 300 including a first identifier, may identify a second identifier associated with the first identifier, may annotate the first event, and may correlate the first event to previous interactions using the annotation. In various implementations, second data processing system 400 generates annotations. Additionally or alternatively, second data processing system 400 may generate correlation information. For example, second data processing system 400 may identify previous interactions that are correlated with an event. The interactions described by the correlation information may include viewing a content item (e.g., navigating to a webpage in which a content item is provided and/or determining that the item or a portion of the item is provided within a viewport of the device upon which the webpage is viewed, etc.), selecting/clicking a content item, hovering over a content item, and/or other interactions with a content item. In some implementations, second data processing system 400 generates aggregate information. For example, second data processing system 400 may determine how many users completed a conversion after interacting with a content item. The aggregate information may describe a number or grouping of online interactions (e.g., interactions with a number of content items). Additionally or alternatively, the aggregate information may describe an individual online interaction (e.g., a single interaction with a single content item). Aggregate information may include a unique identifier. In some implementations, the identifier identifies a marketing campaign. Additionally or alternatively, the identifier may uniquely identify each online interaction. In some implementations, the aggregate information describes one or more interactions associated with content items. For example, aggregate information may include a time, date, and/or location of online interactions.

Second data processing system 400 may be a server, distributed processing cluster, cloud processing system, or any other computing device. Second data processing system 400 may include or execute at least one computer program or at least one script. In some implementations, second data processing system 400 includes combinations of software and hardware, such as one or more processors configured to execute one or more scripts.

Second data processing system 400 is shown to include identifier database 410, interactions database 420, and processing circuit 430. Identifier database 410 may various identifiers. For example, identifier database 410 may store identifiers used to correlate events across devices. In some implementations, identifier database 410 includes multiple types of identifiers. For example, identifier database 410 may include a first type of specific identifier and a second type of universal identifier. In various implementations, identifier database 410 may include partitions. For example, identifier database 410 may include a first partition to store a first identifier type and a second partition to store a second identifier type such that first and second identifiers cannot be joined. Additionally or alternatively, identifier database 410 may include separate sub-databases. For example, identifier database 410 may include a first sub-database to store identifiers of a first type and a second sub-database to store identifiers of a second type. In some implementations, identifier database 410 includes a data structure to facilitate determining associations between identifiers. For example, identifier database 410 may include a graph structure that represents associations between identifiers of a first type (e.g., specific identifiers, etc.) and identifiers of a second type (e.g., universal identifiers, etc.). In various implementations, the identifiers may be used to correlate events between devices.

Interactions database 420 may store interaction data. In various implementations, the interaction data describes user interactions with content items. For example, the interaction data may describe an ad that a user viewed. Interaction data may include a version, a merchant identifier (e.g., describing what merchant the content item is associated with, etc.), a second identifier, and/or a type. In various implementations, interactions database 420 may store interaction data based on an identifier type. For example, interactions database 420 may store interaction data associated with a first type of identifier in a first partition and may store interaction data associated with a second type of identifier in a second partition. In some implementations, interactions database 420 includes separate sub-databases. For example, interactions database 420 may include a first sub-database to store interaction data associated with a first type of identifier and a second sub-database that is separate of the first sub-database to store interaction data associated with a second type of identifier. Identifier database 410 and/or interactions database 420 may include one or more storage mediums. The storage mediums may include but are not limited to magnetic storage, optical storage, flash storage, and/or RAM. Second data processing system 400 may implement or facilitate various APIs to perform database functions (i.e., managing data stored in identifier database 410 and/or interactions database 420). The APIs can be but are not limited to SQL, ODBC, JDBC, and/or any other data storage and manipulation API.

Processing circuit 430 includes processor 440 and memory 450. Memory 450 may have instructions stored thereon that, when executed by processor 440, cause processing circuit 430 to perform the various operations described herein. The operations described herein may be implemented using software, hardware, or a combination thereof. Processor 440 may include a microprocessor, ASIC, FPGA, etc., or combinations thereof. In many implementations, processor 440 may be a multi-core processor or an array of processors. Memory 450 may include, but is not limited to, electronic, optical, magnetic, or any other storage devices capable of providing processor 440 with program instructions. Memory 450 may include a floppy disk, CD-ROM, DVD, magnetic disk, memory chip, ROM, RAM, EEPROM, EPROM, flash memory, optical media, or any other suitable memory from which processor 440 can read instructions. The instructions may include code from any suitable computer programming language such as, but not limited to, C, C++, C#, Java, JavaScript, Perl, HTML, XML, Python and Visual Basic.

Memory 450 may include identifier circuit 452, annotation circuit 454, analysis circuit 456, and reporting circuit 458. Identifier circuit 452 may determine associations between identifiers. For example, identifier circuit 452 may receive a first identifier and may identify a second identifier associated with the first identifier. In some implementations, identifier circuit 452 may query an external system to determine identifiers. For example, identifier circuit 452 may query an external identity service with a first identifier and receive from the external identity service a second identifier associated with the first identifier. Additionally or alternatively, identifier circuit 452 may search identifier database 410 to determine an identifier. For example, identifier database 410 may store linked identifiers and identifier circuit 452 may search identifier database 410 for identifiers linked to a specific identifier. In various implementations, identifier circuit 452 correlates between identifiers of different types. For example, identifier circuit 452 may receive an identifier of a first type and may identify one or more identifiers of a second type associated with the identifier of the first type.

Annotation circuit 454 may receive interaction data and annotate the interaction data. In various implementations, annotation circuit 454 identifies one or more previous interactions associated with the interaction data and annotates the interaction data based on the one or more previous interactions. For example, annotation circuit 454 may receive interaction data having a first identifier and may search interactions database 420 for previous interactions associated with the first identifier. Annotation is discussed in greater detail below with reference to FIG. 5. In various implementations, annotation circuit 454 determines annotations based on an identifier type of identified previous interactions. The annotation generated by annotation circuit 454 may be associated with a preference for previous interactions associated with a specific type of identifier. For example, an annotation of interaction data may specify a preference for previous interactions associated with a first type of identifier over previous interactions associated with a second type of identifier. Annotation circuit 454 may facilitate deduplication of keyspaces (e.g., sets of data having different identifiers, etc.).

Analysis circuit 456 may correlate interaction data with previous interactions. For example, analysis circuit 456 may receive interaction data associated with an event on client device 110 and may identify one or more previous interactions associated with the interaction data. As an additional example, analysis circuit 456 may receive interaction data describing a conversion and may identify one or more user interactions with content items that led to the conversion. In various implementations, analysis circuit 456 searches interactions database 420 to identify previous interactions. In some implementations, analysis circuit 456 identifies previous interactions associated with an identifier. For example, analysis circuit 456 may search a first partition of interactions database 420 using a first type of identifier and may search a second partition of interactions database 420 using a second type of identifier to identify previous interactions. In various implementations, analysis circuit 456 generates deduplicated results. For example, analysis circuit 456 may receive annotated interaction data and may determine previous interactions associated with an event using the annotation (e.g., by filtering for previous interactions having a specific type of identifier, etc.). In some implementations, analysis circuit 456 uses annotations to improve computational efficiency. For example, analysis circuit 456 may receive annotated interaction data that indicates that the event associated with the interaction data is only eligible for attribution with previous interactions associated with a first type of identifier and may only search interactions database 420 for previous interactions associated with the first type of identifier (hence reducing the search space and saving on device resources by limiting analysis) instead of searching interactions database 420 for previous interactions associated with the first type of identifier and other types of identifiers. In various implementations, analysis circuit 456 performs statistical operations on received data to produce statistical measurements describing the received data. For example, analysis circuit 456 may determine an interaction rate associated with a marketing campaign. In some implementations, analysis circuit 456 generates demographic information (e.g., user distributions, etc.), geographic results (e.g., location distributions, etc.), and/or audiences (e.g., a target group of users based on one or more parameters, for example users who purchased more than a threshold amount, etc.). In various implementations, analysis circuit 456 transmits results to reporting circuit 458 for reporting.

Reporting circuit 458 may receive results from analysis circuit 456 and may transmit the results to external systems. For example, reporting circuit 458 may receive interaction data and one or more previous interactions associated with the interaction data from analysis circuit 456 and may transmit the results to a merchant associated with the interaction data. As a non-limiting example, a user shown a video may click on the video. A content provider providing the video may wish to know how many users clicked on the video. In some implementations, users may interact with other content provided by the content provider as a result of their interaction with the first content item. For example, a user shown the video may later visit a website maintained by the content provider to purchase an item featured in the video. In some implementations, the interaction is or is associated with an online conversion. A conversion may be a transaction, such as a purchase of a product/service, provision of requested information, and/or the like. Reporting circuit 458 may facilitate robust reporting and analysis of user interactions with online content while preserving sensitive information.

Third data processing system 500 may receive annotated interaction data from first data processing system 300 and may request analysis from second data processing system 400. For example, third data processing system 500 may retrieve first interaction data associated with a first type of identifier and may send the first interaction data to analysis circuit 456 and may retrieve second interaction data associated with a second type of identifier and may send the second interaction data to analysis circuit 456 for analysis. In some implementations, third data processing system 500 determines supplemental data. For example, third data processing system 500 may determine one or more identifiers associated with a first identifier (e.g., via identifier circuit 452, etc.).

Third data processing system 500 may be a server, distributed processing cluster, cloud processing system, or any other computing device. Third data processing system 500 may include or execute at least one computer program or at least one script. In some implementations, third data processing system 500 includes combinations of software and hardware, such as one or more processors configured to execute one or more scripts.

Third data processing system 500 is shown to include processing circuit 510. Processing circuit 510 includes processor 520 and memory 530. Memory 530 may have instructions stored thereon that, when executed by processor 520, cause processing circuit 510 to perform the various operations described herein. The operations described herein may be implemented using software, hardware, or a combination thereof. Processor 520 may include a microprocessor, ASIC, FPGA, etc., or combinations thereof. In many implementations, processor 520 may be a multi-core processor or an array of processors. Memory 530 may include, but is not limited to, electronic, optical, magnetic, or any other storage devices capable of providing processor 520 with program instructions. Memory 530 may include a floppy disk, CD-ROM, DVD, magnetic disk, memory chip, ROM, RAM, EEPROM, EPROM, flash memory, optical media, or any other suitable memory from which processor 520 can read instructions. The instructions may include code from any suitable computer programming language such as, but not limited to, C, C++, C#, Java, JavaScript, Perl, HTML, XML, Python and Visual Basic.

Information aggregation and analysis request circuit 532 may retrieve annotated interaction data and may request analysis of the interaction data. In some implementations, information aggregation and analysis request circuit 532 determines supplemental data. For example, information aggregation and analysis request circuit 532 may identify one or more supplemental identifiers associated with an identifier in the interaction data. In some implementations, information aggregation and analysis request circuit 532 retrieves conversion data and determines an annotation associated with the retrieved conversion data (e.g., by lookup in annotated conversions database 310, etc.). In some implementations, information aggregation and analysis request circuit 532 may identify one or more previous interactions associated with interaction data. In various implementations, information aggregation and analysis request circuit 532 retrieves information from annotated conversions database 310 and passes information to analysis circuit 456.

Figure 3:
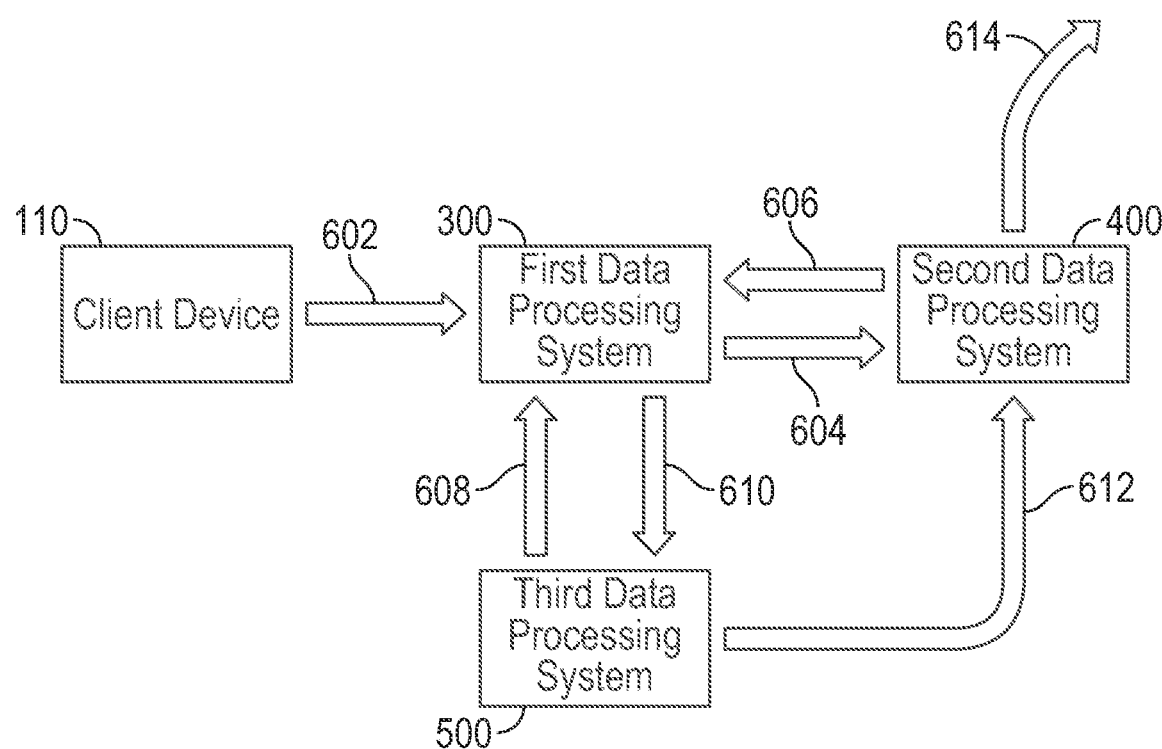
FIG. 3 is a diagram illustrating an architecture for data transfer and correlation, according to an implementation.

Referring now to FIG. 3, an improved computer architecture for accurately and efficiently correlating events from different devices is shown, according to an illustrative implementation. In brief summary, first data processing system 300, second data processing system 400, and third data processing system 500 may correlate interaction data from events on client device 110 with previous interaction data to determine interaction information. For example, client device 110 may detect an event, generate interaction data, and transmit the interaction data to first data processing system 300. First data processing system 300, second data processing system 400, and third data processing system 500 may engage in a collaborative analysis process to determine one or more previous interactions associated with the event on client device 110 while preventing duplicate correlation results by annotating the interaction data received from client device 110.

At step 602, client device 110 may transmit interaction data (e.g., via application 112 and/or SDK 120, etc.) to first data processing system 300. In some implementations, client device 110 transmits bundled interaction data. In various implementations, step 602 is in response to detecting an event on client device 110. For example, a user may complete a conversion on client device 110. In some implementations, the interaction data transmitted to first data processing system 300 includes one or more identifiers. For example, the interaction data may include a first type of identifier and a second type of identifier.

At step 604, first data processing system 300 may request annotation of interaction data received from client device 110. In various implementations, step 604 includes transmitting one or more identifiers associated with the interaction data to second data processing system 400. In some implementations, first data processing system 300 transmits a first identifier (e.g., an identifier of a first type, etc.) to second data processing system 400 and second data processing system 400 identifies a second identifier (e.g., an identifier of a second type, etc.) based on the first identifier.

At step 606, second data processing system 400 returns an annotation associated with the interaction data. In various implementations, the annotation indicates a preference for previous interactions associated with a specific type of identifier. For example, the preference may indicate that the event associated with the interaction data is only eligible for attribution with previous events having a first type of identifier. In various implementations, the preference is a binary. For example, the preference may indicate that the event associated with the interaction data is or is not eligible for attribution (e.g., can be attributed, cannot be attributed, etc.) with previous interactions having a specific type of identifier. As another example, an event may have an annotation that indicates that the event is eligible for attribution with previous interactions having a first type of identifier but not eligible for attribution with previous interactions having a second type of identifier and analysis and deduplication system 202 may find two copies of a previous interaction, one having the first type of identifier and one having the second type of identifier and may only attribute the event to the copy of the previous interaction having the first type of identifier based on the annotation. In various implementations, first data processing system 300 saves the annotation with the interaction data. At step 608, third data processing system 500 may request the interaction data and/or annotation from first data processing system 300. At step 610, first data processing system 300 may send third data processing system 500 the interaction data and/or annotation. At step 612, third data processing system 500 may request analysis of annotated interaction data from second data processing system 400. Second data processing system 400 may analyze the annotated interaction data to identify one or more previous interactions associated with the annotated interaction data. At step 614, second data processing system 400 may transmit the analysis results to an external system. For example, second data processing system 400 may transmit aggregate statistics illustrating the effectiveness of an advertising campaign to a merchant. In some implementations, the results include a conversion and/or attribution rate. In various implementations, second data processing system 400 facilitates deduplicated correlation of events across devices. For example, second data processing system 400 may use annotation information to deduplicate previous interaction data associated with different identifiers but relating to the same event.

Figure 4:
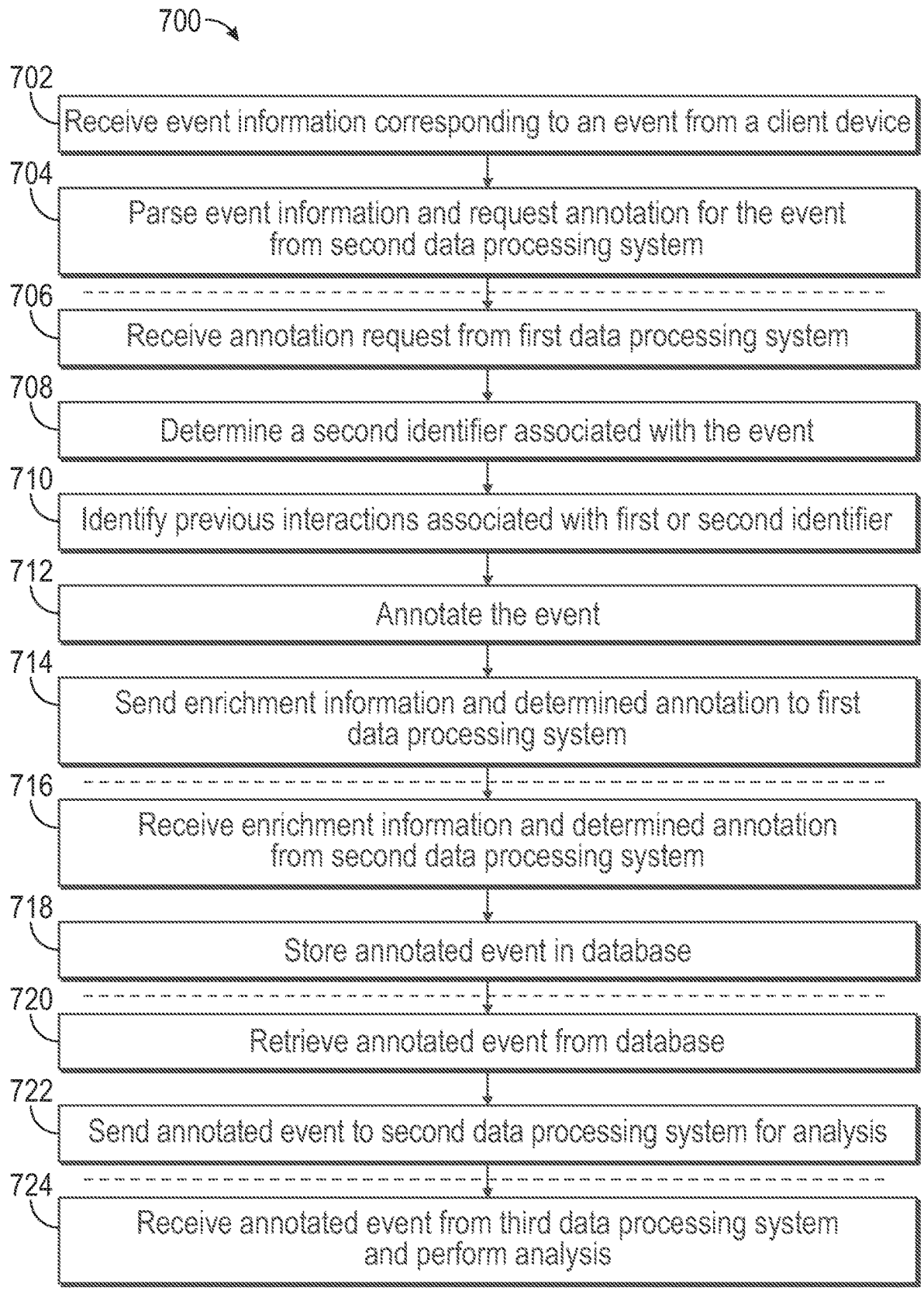
FIG. 4 is a flow diagram illustrating a method of analyzing and deduplicating event data using the architecture of FIG. 3, according to an illustrative implementation.

Referring now to FIG. 4, method 700 of preparing interaction data for deduplicated analysis is shown, according to an implementation. In brief summary, analysis and deduplication system 202 may annotate interaction data and use the annotation during analysis of the interaction data to determine previous interactions associated with the interaction data while preventing duplicate copies of previous interactions that are associated with the same event from being included. In various implementations, first data processing system 300, second data processing system 400, and third data processing system 500 perform method 700 collaboratively. Additionally or alternatively, one or more components (or a combination thereof) of analysis and deduplication system 202 may perform method 700. At step 702, first data processing system 300 may receive event information corresponding to an event from a client device. In various implementations, the event information includes interaction data corresponding to an event on client device 110. In some implementations, the event information is bundled. At step 704, first data processing system 300 may parse the event information and request annotation for the event from second data processing system 400. In various implementations, parsing the event information includes identifying one or more identifiers associated with the event information.

At step 706, second data processing system 400 receives the annotation request from first data processing system 300. In various implementations, the annotation request includes one or more identifiers. For example, the annotation request may include a first identifier having a first type. In some implementations, the annotation request may include interaction data. The interaction data may describe a content item associated with the interaction, a time of the interaction, a type of interaction, and/or other information. At step 708, second data processing system 400 may determine a second identifier associated with the event. For example, step 708 may include determining a second identifier of a second type associated with a first identifier of a first type included in the interaction data. In some implementations, step 708 includes querying a database having correlations between identifiers to determine a second identifier associated with a first identifier.

At step 710, second data processing system 400 may identify previous interactions associated with a first or second identifier. In various implementations, step 710 includes searching one or more databases to identify previous interactions. For example, second data processing system 400 may search a first database for interactions associated with a first identifier (e.g., a first type of identifier, etc.) and may search a second database for interactions associated with a second identifier (e.g., a second type of identifier, etc.). In various implementations, second data processing system 400 searches for previous interactions that are correlated with the event specified by the interaction data.

At step 712, second data processing system 400 annotates the event associated with the interaction data. In various implementations, second data processing system 400 annotates events based on the previous interactions identified in step 710. For example, second data processing system 400 may annotate an event to indicate that analysis of the event should prefer previous interactions associated with a first type of identifier in response to identifying one or more previous interaction associated with the first type of identifier. At step 714, second data processing system 400 sends enrichment information and the determined annotation to first data processing system 300. In various implementations, the enrichment information includes one or more additional identifiers (e.g., an identifier associated with a content item, etc.), interaction information, and/or the one or more previous interactions analyzed during step 712.

At step 716, first data processing system 300 may receive the enrichment information and determined annotation from second data processing system 400. At step 718, first data processing system 300 stores the annotated event in a database. For example, first data processing system 300 may store the annotated event in annotated conversions database 310. In some implementations, first data processing system 300 stores copies of annotated events in different databases based on the associated identifier. For example, a first event may be associated with a first interaction data having a first identifier and a second identifier. First data processing system 300 may receive an annotation for the first event from second data processing system 400 and may store a first copy of the first interaction data with the annotation and the first identifier in a first database and may store a second copy of the first interaction with the annotation and the second identifier in a second database.

At step 720, third data processing system 500 may retrieve the annotated event from the database. For example, third data processing system 500 may retrieve the annotated event from annotated conversions database 310. In some implementations, step 720 includes retrieving a first copy of the annotated event having a first identifier and retrieving a second copy of the annotated event having a second identifier. In some implementations, step 720 includes retrieving interaction data from previous interactions associated with the annotated event. Additionally or alternatively, step 720 may include retrieving interaction data associated with the annotated event. At step 722, third data processing system 500 may send the annotated event to second data processing system 400 for analysis. At step 724, second data processing system 400 may receive the annotated event from third data processing system 500 and perform analysis. In various implementations, step 724 includes determining interaction information. For example, second data processing system 400 may identify one or more previous interactions associated with the annotated event. In various implementations, second data processing system 400 uses annotation information during analysis to deduplicate the interaction information.

Figure 5:
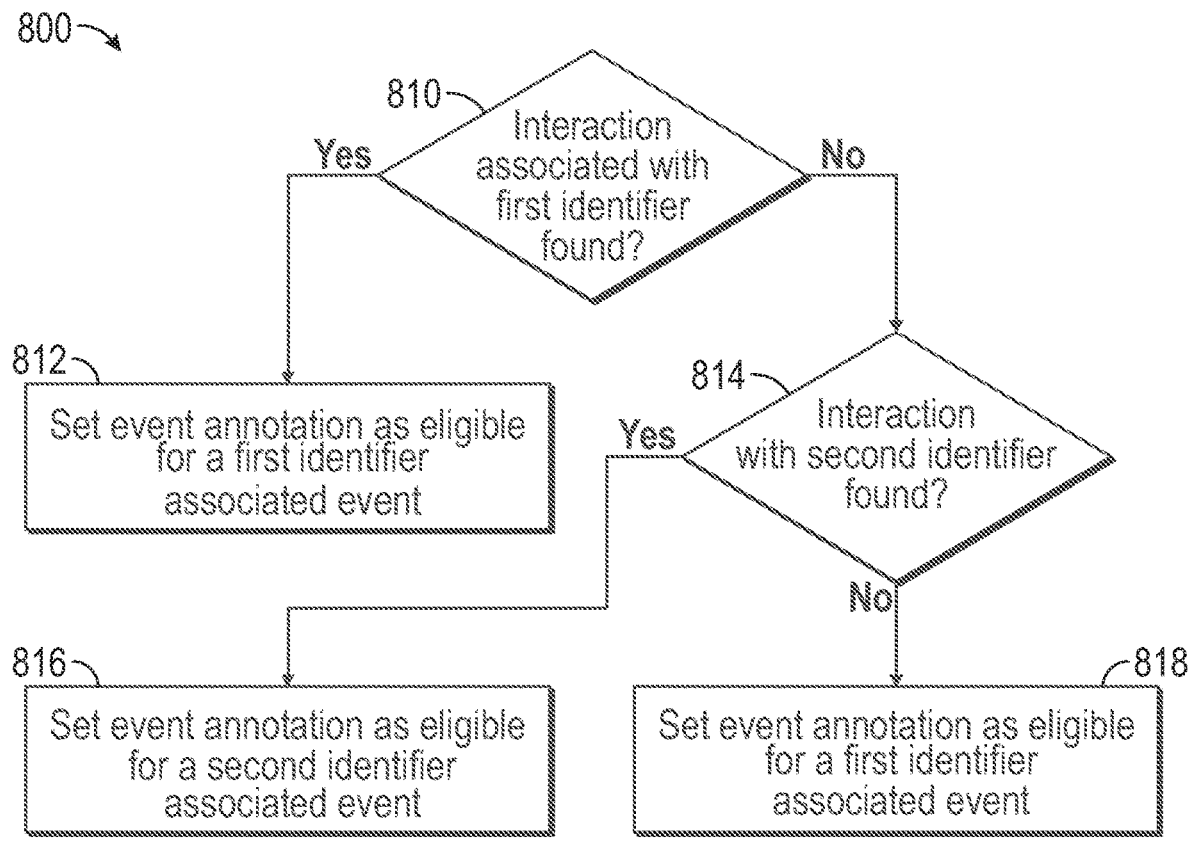
FIG. 5 is a flow diagram illustrating a method of determining event annotations using the architecture of FIG. 3, according to an illustrative implementation.

Referring now to FIG. 5, method 800 of determining an event annotation is shown, according to an implementation. In various implementations, second data processing system 400 performs method 800. In some implementations, method 800 is performed in response to receiving an annotation request including interaction data and/or at least one identifier associated with an event. For example, second data processing system 400 may perform method 800 in response to receiving an annotation request including interaction data having a first and second identifier. At step 810, second data processing system 400 may determine whether a previous interaction associated with a first identifier is found. In various implementations, step 810 includes searching a first database for previous interactions associated with a first identifier included in the interaction data. In some implementations, the first identifier is an identifier having a first type. For example, second data processing system 400 may search a first database having identifiers of a first type for an identifier that matches an identifier of the first, type that was included in the annotation request. If a previous interaction associated with the first identifier is found, then second data processing system 400 may set the event annotation as eligible for a first identifier associated event attribution (step 812). In some implementations, step 812 includes setting one or more variable values included in the interaction data. For example, step 812 may include setting four Boolean values such as: bool first_open_attribution_account_preferred_over_device_id=0, bool post_install_event_attribution_account_preferred_over_device_id=0, bool first_open_attribution_device_preferred_over_account_id=1, and bool post_install_event_attribution_device_preferred_over_account_id=1. In various implementations, the annotation may be used by analysis and deduplication system 202 during analysis. For example, analysis and deduplication system 202 may identify a first and second previous interaction associated with an event based on shared identifiers and may determine that the first previous interaction having a first identifier is not associated with the event because the event includes an annotation that specifies that the event is not eligible for attribution with previous interactions having the first identifier but the second previous interaction having the second identifier is associated with the event because the event includes an annotation that specifies that the event is eligible for attribution with previous interactions having the second identifier. Additionally or alternatively, analysis and deduplication system 202 may use annotations to improve analysis efficiency. For example, analysis and deduplication system 202 may determine that an event is not eligible for attribution with a previous interaction having a first identifier and may avoid searching a database having previous interactions associated with the first identifier. In some implementations, step 812 includes setting the event annotation as ineligible for a second identifier associated event interaction. Additionally or alternatively, step 812 may include setting the event annotation to reflect eligibility/ineligibility for events associated with a number of identifiers included in the annotation request (e.g., setting the event annotation associated with an event as ineligible for attribution with previous interactions having one of four identifiers and as eligible for attribution with previous interactions having a fifth identifier, etc.).

At step 814, second data processing system 400 may determine whether a previous interaction associated with a second identifier is found. In various implementations, step 814 includes searching a database for previous interactions associated with a second identifier included in the interaction data of the annotation request. In some implementations, the second identifier is a different type of identifier than the first identifier. If a previous interaction associated with the second identifier is found, then second data processing system 400 may set the event annotation as eligible for a second identifier associated event attribution (step 816). In some implementations, step 816 includes setting the event annotation as ineligible for a first identifier associated event interaction. In some implementations, second data processing system 400 sets the event annotation based on different criteria. For example, second data processing system 400 may set the event annotation based on identifying a threshold number of previous events associated with the second identifier. If a previous interaction associated with the second identifier is not found, then second data processing system 400 may set the event annotation as eligible for a first identifier associated event attribution (step 818). In some implementations, step 818 includes setting the event annotation as ineligible for a second identifier associated event interaction. In some implementations, steps 812, 816, and/or 818 include setting an event annotation that is specific to a type of interaction. For example, interaction data associated with an event may include a number of annotations corresponding to different types of interactions, such as a first annotation corresponding to a first open type interaction (e.g., an interaction associated with the first time a user opens an application, etc.) and a second post-installation type interaction (e.g., an interaction that occurs after a user has installed an application, etc.).

Figure 6A:
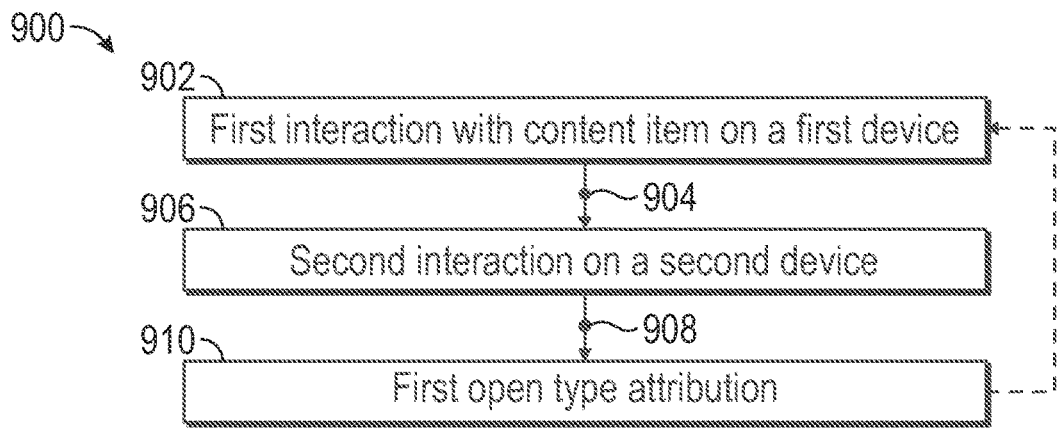
FIG. 6A is a flow diagram illustrating a possible implementation of the architecture of FIG. 3, according to an illustrative implementation.
Figure 6B:
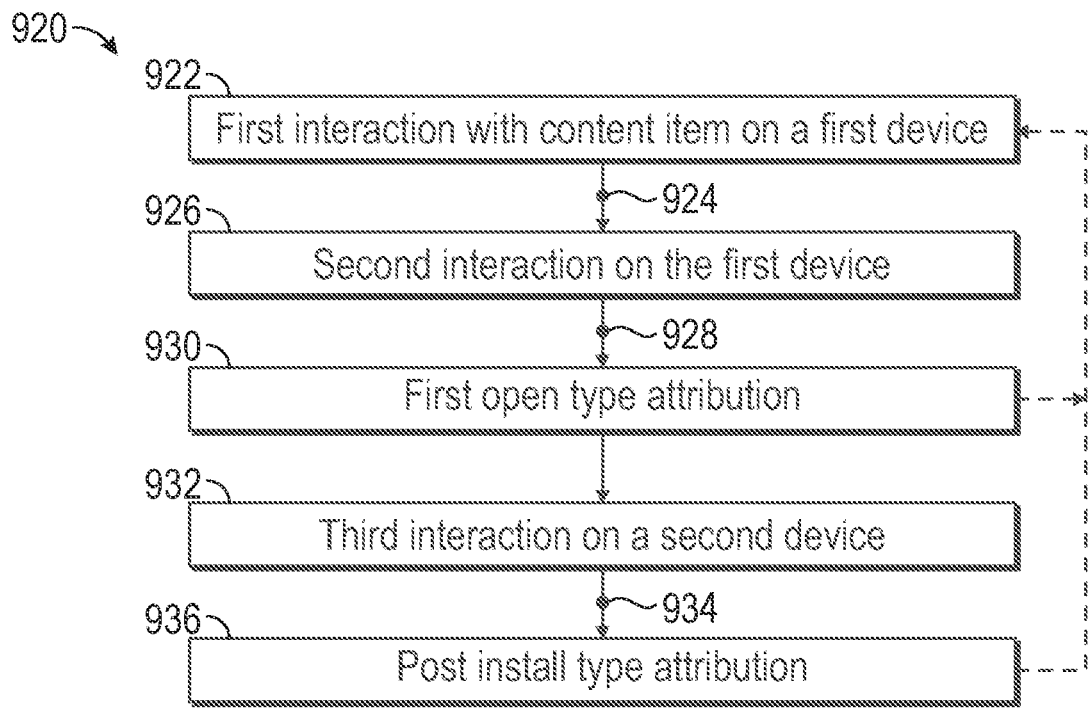
FIG. 6B is a flow diagram illustrating another possible implementation of the architecture of FIG. 3, according to an illustrative implementation.
Figure 6C:
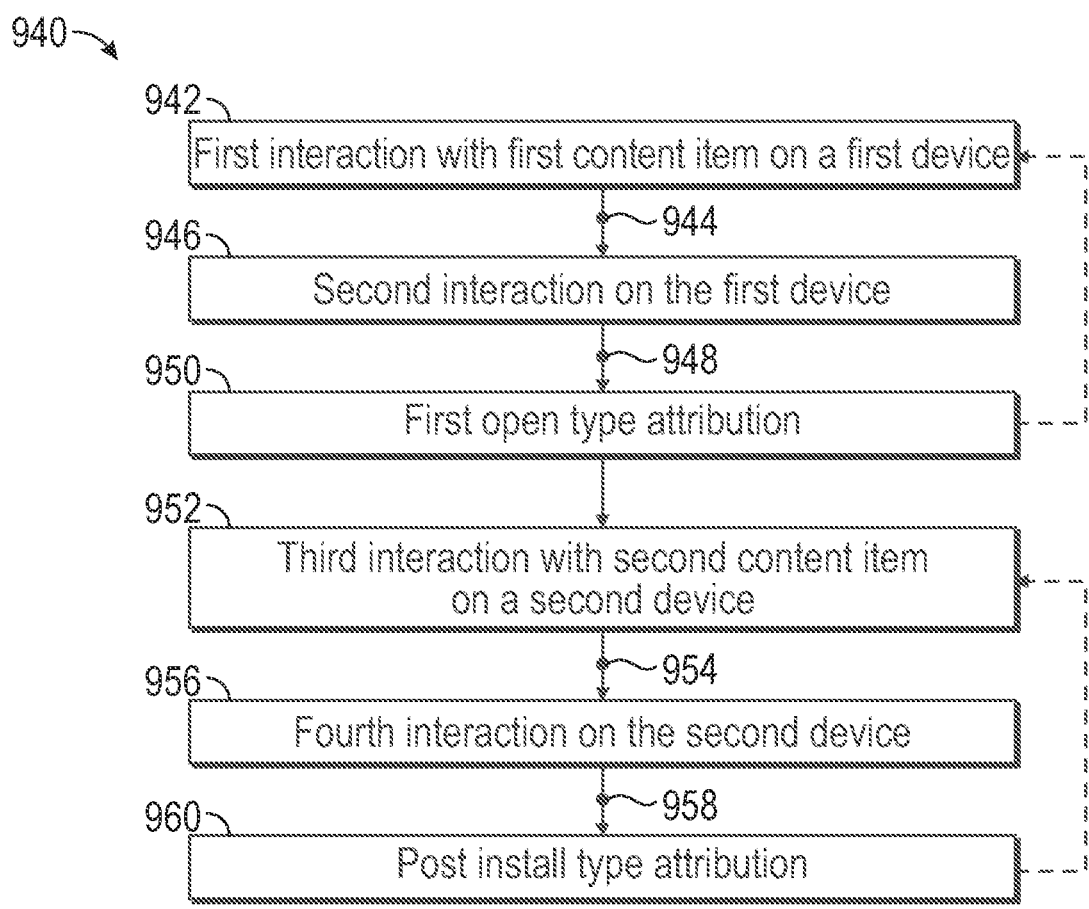
FIG. 6C is a flow diagram illustrating another possible implementation of the architecture of FIG. 3, according to an illustrative implementation.

Referring now to FIGS. 6A-6C, several examples of performance of analysis and deduplication system described herein are shown, according to several illustrative implementations. Referring now specifically to FIG. 6A, example 900 of cross-device attribution of events is shown, according to an illustrative implementation. At step 902, a first device may detect a first interaction with a content item. In various implementations, the first interaction may include viewing an advertisement. Step 902 may include transmitting interaction data associated with the first interaction from the first device to analysis and deduplication system 202. In various implementations, the interaction data includes a first identifier and a second identifier. In some implementations, the first identifier has a first type and the second identifier has a second type. For example, the first identifier may correspond to a signed-in device and the second identifier may correspond to a non-signed-in device. At step 904, analysis and deduplication system 202 may annotate the first interaction. For example, analysis and deduplication system 202 may determine that there are no previous interactions associated with an identifier associated with the first interaction and may annotate the first interaction to prefer previous interactions associated with a first identifier (e.g., a first identifier having a first type, etc.). In various implementations, step 904 includes saving one or more copies of the interaction data from the first device, each copy associated with a different identifier. For example, analysis and deduplication system 202 may store a first copy of the annotated interaction data having a first identifier and may store a second copy of the annotated interaction data having a second identifier.

At step 906, a second device may detect a second interaction. In various implementations, the second interaction may include downloading and/or opening a mobile application on the second device for the first time. Step 906 may include transmitting interaction data associated with the second interaction from second device to analysis and deduplication system 202. In various implementations, step 906 includes transmitting a first identifier (e.g., a first identifier having a first type, etc.) and a second identifier (e.g., a second identifier having a second type, etc.). At step 908, analysis and deduplication system 202 may annotate the second interaction. For example, analysis and deduplication system 202 may identify the first interaction based on an identifier associated with the first interaction and/or the second interaction and may annotate the second interaction to prefer previous interactions associated with the identifier. In some implementations, the annotation may specify a type of attribution that the second interaction is eligible for. For example, analysis and deduplication system 202 may determine based on the first interaction data and/or the previous interactions that were identified as being associated with the second interaction that the second interaction is eligible for an open type attribution but not eligible for a post-install type attribution. At step 910, analysis and deduplication system 202 may analyze the annotated interaction data associated with the second interaction to generate a first open type attribution that associates the second interaction with the first interaction. In various implementations, step 910 includes searching for previous interactions based on the annotation and identifying the first interaction based on an identifier associated with the first interaction and/or the second interaction. For example, analysis and deduplication system 202 may read the annotation associated with the second interaction, may identify a database having previous interactions associated with an identifier associated with the annotation, may identify a previous interaction in the database having the same identifier as the second interaction, and may analyze the identified previous interaction to generate the first open type attribution. In various implementations, analysis and deduplication system 202 uses the annotation to deduplicate between a copy of the first interaction stored with a first identifier and a copy of the first interaction stored with a second identifier.

Referring now specifically to FIG. 6B, example 920 of another cross-device attribution of events is shown, according to an illustrative implementation. At step 922, a first device may detect a first interaction with a content item. In various implementations, the first interaction may include viewing an advertisement. Step 922 may include transmitting interaction data from first device to analysis and deduplication system 202. In some implementations, the interaction data includes a first identifier. For example, the interaction data may include a first identifier having a first type associated with a non-signed-in device. At step 924, analysis and deduplication system 202 may annotate the first interaction. For example, analysis and deduplication system 202 may determine that there are no previous interactions associated with an identifier associated with the first interaction and may annotate the first interaction to prefer previous interactions associated with a first identifier (e.g., a first identifier having a first type, etc.). In various implementations, step 904 includes saving one or more copies of the interaction data from the first device, each copy associated with a different identifier. For example, analysis and deduplication system 202 may store a first copy of the annotated interaction data having a first identifier.

At step 926, the first device may detect a second interaction. In various implementations, the second interaction may include downloading and/or opening a mobile application on the first device for the first time. Step 926 may include transmitting interaction data associated with the second interaction from the first device to analysis and deduplication system 202. In various implementations, step 926 includes transmitting a first identifier (e.g., a first identifier having a first type, etc.) and a second identifier (e.g., a second identifier having a second type, etc.). At step 928, analysis and deduplication system 202 may annotate the second interaction. For example, analysis and deduplication system 202 may identify the first interaction based on an identifier associated with the first interaction and/or the second interaction and may annotate the second interaction to prefer previous interactions associated with the identifier. In some implementations, the annotation may specify a type of attribution that the second interaction is eligible for. For example, analysis and deduplication system 202 may determine based on the first interaction data and/or the previous interactions that were identified as being associated with the second interaction that the second interaction is eligible for an open type attribution but not eligible for a post-install type attribution. At step 930, analysis and deduplication system 202 may analyze the annotated interaction data associated with the second interaction to generate a first open type attribution that associates the second interaction with the first interaction. In various implementations, step 930 includes searching for previous interactions based on the annotation and identifying the first interaction based on an identifier associated with the first interaction and/or the second interaction.

At step 932, a second device may detect a third interaction. In various implementations, the third interaction may include performing an action on a mobile application (e.g., completing a transaction, editing a profile, etc.). Step 932 may include transmitting interaction data associated with the third interaction from the second device to analysis and deduplication system 202. In various implementations, step 932 includes transmitting a first identifier (e.g., a first identifier having a first type, etc.) and a second identifier (e.g., a second identifier having a second type, etc.). At step 934, analysis and deduplication system 202 may annotate the third interaction. For example, analysis and deduplication system 202 may identify the first interaction and the second interaction based on an identifier associated with the first interaction, the second interaction, and/or the third interaction and may annotate the third interaction to prefer previous interactions associated with the identifier. In some implementations, the annotation may specify a type of attribution that the third interaction is eligible for. For example, analysis and deduplication system 202 may determine based on the first interaction data, the second interaction data, and/or the previous interactions that were identified as being associated with the third interaction that the third interaction is eligible for a post-install type attribution but not eligible for a first open type attribution. At step 936, analysis and deduplication system 202 may analyze the annotated interaction data associated with the third interaction to generate a post-install type attribution that associates the third interaction with the first interaction. In various implementations, step 936 includes searching for previous interactions based on the annotation and identifying the first interaction and the second interaction based on an identifier associated with the first interaction, the second interaction, and/or the third interaction. In various implementations, analysis and deduplication system 202 uses the annotation to deduplicate between a copy of the second interaction stored with a first identifier and a copy of the second interaction stored with a second identifier. Additionally or alternatively, analysis and deduplication system 202 may use the annotation to determine the type of attribution associated with the third interaction. For example, the annotation may indicate that an account associated with the third interaction has already had a first open type attribution and is only eligible for a post-install type attribution based on analysis and deduplication system 202 previously identifying the first and second interactions based on a shared identifier associated with the first interaction, the second interaction, and the third interaction.

Referring now specifically to FIG. 6C, example 940 of another cross-device attribution of events is shown, according to an illustrative implementation. At step 942, a first device may detect a first interaction with a content item. In various implementations, the first interaction may include viewing an advertisement. Step 942 may include transmitting interaction data from first device to analysis and deduplication system 202. In some implementations, the interaction data includes a first identifier and a second identifier. For example, the interaction data may include a first identifier having a first type associated with a non-signed-in device and a second identifier having a second type associated with a sign-in device. At step 944, analysis and deduplication system 202 may annotate the first interaction. For example, analysis and deduplication system 202 may determine that there are no previous interactions associated with an identifier associated with the first interaction and may annotate the first interaction to prefer previous interactions associated with a first identifier (e.g., a first identifier having a first type, a first identifier associated with a non-signed-in device, etc.). In various implementations, step 944 includes saving one or more copies of the interaction data from the first device, each copy associated with a different identifier. For example, analysis and deduplication system 202 may store a first copy of the annotated interaction data having a first identifier and a second copy of the annotated interaction data having a second identifier.

At step 946, the first device may detect a second interaction. In various implementations, the second interaction may include downloading and/or opening a mobile application on the first device for the first time. Step 946 may include transmitting interaction data associated with the second interaction from the first device to analysis and deduplication system 202. In various implementations, step 946 includes transmitting a first identifier (e.g., a first identifier having a first type, etc.) and a second identifier (e.g., a second identifier having a second type, etc.). At step 948, analysis and deduplication system 202 may annotate the second interaction. For example, analysis and deduplication system 202 may identify the first interaction based on an identifier associated with the first interaction and/or the second interaction and may annotate the second interaction to prefer previous interactions associated with the identifier. In some implementations, the annotation may specify a type of attribution that the second interaction is eligible for example, analysis and deduplication system 202 may determine based on the first interaction data and/or the previous interactions that were identified as being associated with the second interaction that the second interaction is eligible for an open type attribution but not eligible for a post-install type attribution. At step 950, analysis and deduplication system 202 may analyze the annotated interaction data associated with the second interaction to generate a first open type attribution that associates the second interaction with the first interaction. In various implementations, step 950 includes searching for previous interactions based on the annotation and identifying the first interaction based on an identifier associated with the first interaction and/or the second interaction.

At step 952, a second device may detect a third interaction. In various implementations, the third interaction may include viewing an advertisement. Step 952 may include transmitting interaction data associated with the third interaction from the second device to analysis and deduplication system 202. In various implementations, step 952 includes transmitting a first identifier (e.g., a first identifier having a first type, etc.) and a second identifier (e.g., a second identifier having a second type, etc.). At step 954, analysis and deduplication system 202 may annotate the third interaction. For example, analysis and deduplication system 202 may identify the first interaction and the second interaction based on an identifier associated with the first interaction, the second interaction, and/or the third interaction and may annotate the third interaction to prefer previous interactions associated with the identifier. In some implementations, the annotation may specify a type of attribution that the third interaction is eligible for. For example, analysis and deduplication system 202 may determine based on the first interaction data, the second interaction data, and/or the previous interactions that were identified as being associated with the third interaction that the third interaction is eligible for a post-install type attribution but not eligible for a first open type attribution. In various implementations, at step 954 analysis and deduplication system 202 determines that the third interaction is not associated with the first and/or second interactions. For example, analysis and deduplication system 202 may determine that the first and second interactions are not associated with the third interaction based on interaction data of the first, second, and/or third interactions. At step 956, the second device may detect a fourth interaction. For example, the fourth interaction may include completing a conversion. In various implementations, step 956 may include transmitting interaction data. For example, the second device may transmit interaction data having a first identifier and a second identifier to analysis and deduplication system 202.

At step 958, analysis and deduplication system 202 may annotate the fourth interaction. For example, analysis and deduplication system 202 may identify the first interaction, the second interaction, and/or the third interaction based on an identifier associated with the first interaction, the second interaction, the third interaction, and/or the fourth interaction and may annotate the fourth interaction to prefer previous interactions associated with the identifier. At step 960, analysis and deduplication system 202 may analyze the annotated interaction data associated with the fourth interaction to generate a post-install type attribution that associates the fourth interaction with the third interaction. In various implementations, step 960 includes searching for previous interactions based on the annotation and identifying the third interaction based on an identifier associated with the third and fourth interactions. In various implementations, analysis and deduplication system 202 uses the annotation to deduplicate between a copy of the third interaction stored with a first identifier and a copy of the third interaction stored with a second identifier. Additionally or alternatively, analysis and deduplication system 202 may use the annotation to determine the type of attribution associated with the fourth interaction. For example, the annotation may indicate that an account associated with the fourth interaction has already had a first open type attribution and is only eligible for a post-install type attribution based on analysis and deduplication system 202 previously identifying the first and second interactions based on a shared identifier associated with the first interaction, the second interaction, the third interaction, and the fourth interaction.

Figure 7:
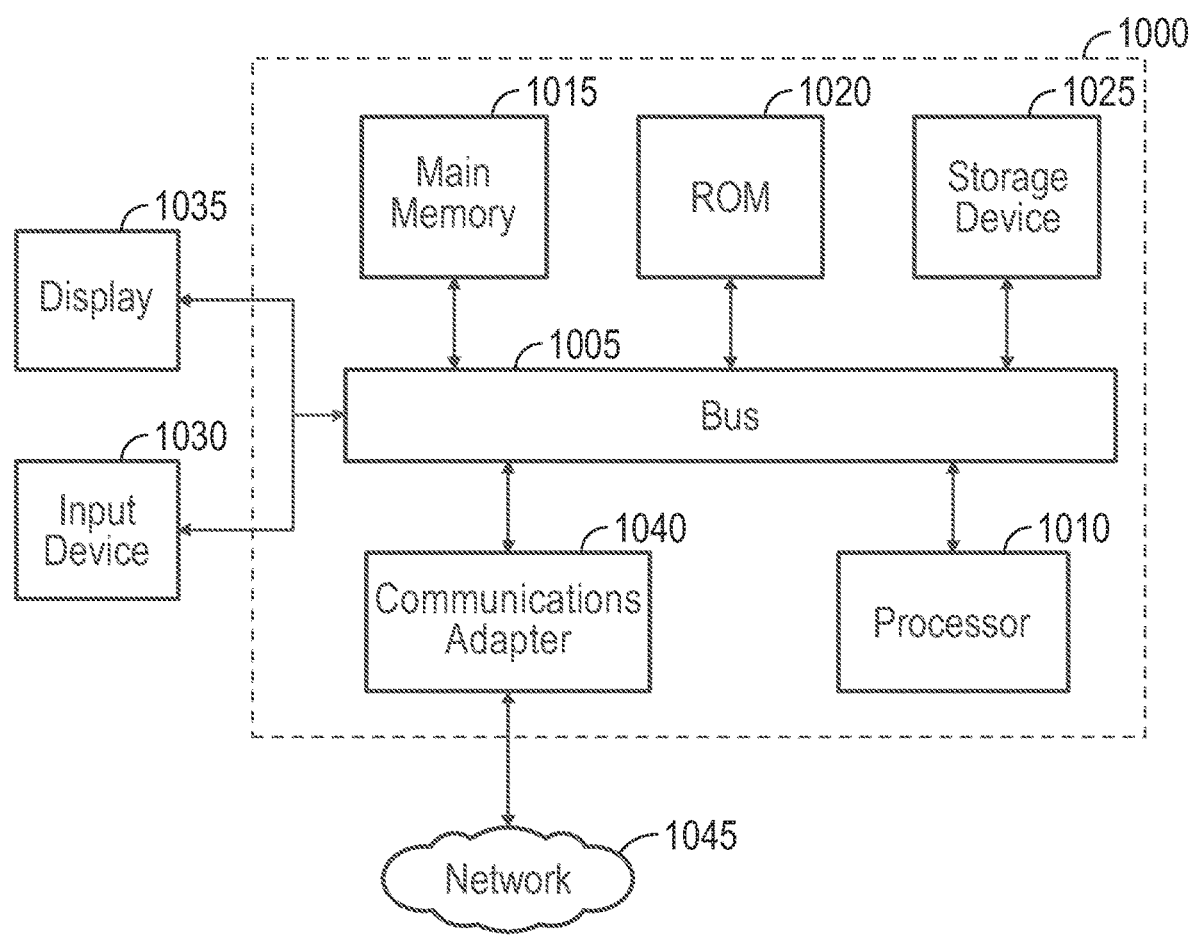
FIG. 7 is a block diagram of a computing system, according to an illustrative implementation.

FIG. 7 illustrates a depiction of a computing system 1000 that can be used, for example, to implement any of the illustrative systems (e.g., system 200, etc.) described in the present disclosure. The computing system 1000 includes a bus 1005 or other communication component for communicating information and a processor 1010 coupled to the bus 1005 for processing information. The computing system 1000 also includes main memory 1015, such as a random access memory ("RAM") or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a read only memory ("ROM") 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

In some implementations, the computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

System and methods of the present disclosure may offer many benefits. Some systems may be unable to identify events that share a characteristic. For example, a traditional system may be unable to determine an association between related events that occur on different devices. For example, a user using a first device may update an account setting and then while using the account on a second device experience a failure (e.g., a software bug, etc.) related to the updated setting. A traditional system may be unable to determine what led to the failure because the traditional system cannot associate the setting update that occurred on the first device with the failure that occurred on the second device. In various implementations, such traditional system are limited by using a first identifier type (e.g., a device identifier) to identify events. It can be beneficial to be able to identify events that share a characteristic, such as events that occur across devices. For example, identifying events that share a characteristic may facilitate root-cause analysis and/or determining interaction sequences to optimize user experiences and make applications more user-friendly. Therefore, there is a need for a system that can identify events that share a characteristic (e.g., an account, an identifier, etc.).

In some implementations, introduction of a second identifier type (e.g., an account identifier) to identify events may facilitate identifying events that share a characteristic. However, introducing a second identify type may lead to a need to deduplicate between event data. For example, a system may store two copies of interaction data associated with a particular event, a first copy with a first identifier e.g., a device identifier) and a second copy with a second identifier (e.g., an account identifier). When the system receives subsequent interaction data having the first and second identifiers and searches for previous interactions associated with the first and second identifiers, the system may return the first and second copies of the original interaction data, thereby over reporting the number of previous interactions associated with the subsequent interaction. Therefore, there is a need for a system that can identify events that share a characteristic and deduplicate between previous events. The systems and methods of the present disclosure may facilitate identifying events that share a characteristic and deduplication between previous events by annotating interaction data to select a single copy of interaction data associated with each previous interactions, thereby preventing over reporting conversion rates, etc.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). The computer storage medium may be tangible and/or may be non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    receiving, from a device, a first set of interaction data associated with an event, the first set of interaction data including a first identifier and indicating a user interaction with one or more content items;
    identifying a second identifier associated with the first identifier;
    identifying a second set of interaction data associated with one or more previous interactions, the second set of interaction data including at least one of the first identifier or the second identifier;

annotating the first set of interaction data based on the one or more previous interactions, wherein the annotation indicates
  (i) a preference for interaction data associated with previous interactions including the first identifier over interaction data associated with previous interactions including the second identifier, such that the interaction data associated with previous interactions including the first identifier are eligible for attribution to the event and the interaction data associated with previous interactions including the second identifier are ineligible for attribution to the event, or
  (ii) a preference for interaction data associated with previous interactions including the second identifier over interaction data associated with previous interactions including the first identifier, such that the interaction data associated with previous interactions including the second identifier are eligible for attribution to the event and interaction data associated with previous interactions including the first identifier are ineligible for attribution to the event;
determining the event is associated with at least one previous interaction of the one or more previous interactions based on the preference indicated by the annotation, wherein the determining includes analyzing the first set of interaction data and the annotation to attribute the one or more previous interactions to the event, and wherein the analyzing is limited to interaction data, of the second set of interaction data, that includes the preferred identifier indicated by the annotation; and
transmitting an indication that the event is associated with the at least one previous interaction.

2. The method of claim 1, wherein the second set of interaction data including one or more subsets, each of the one or more subsets associated with a respective one of the one or more previous interactions, and at least two subsets of the second set of interaction data are associated with a single previous event, wherein a first subset of the at least two subsets includes the first identifier and a second subset of the at least two subsets includes the second identifier, and wherein the first and second subsets of the second set of interaction data are associated with a second device.

3. The method of claim 1, wherein annotating the interaction data includes:
  determining whether the second set of interaction data includes the first identifier;
  in response to determining that the second set of interaction data includes the first identifier, annotating the first set of interaction data to prefer interaction data associated with previous interactions including the first identifier;
  in response to determining that the second set of interaction data does not include the first identifier, determining whether the second set of interaction data includes the second identifier; and
  in response to determining that the second set of interaction data includes the second identifier, annotating the first set of interaction data to prefer interaction data associated with previous interactions including the second identifier.

4. The method of claim 1, wherein at least one of the one or more previous interactions is associated with a first device and wherein the event is associated with a second device.

5. The method of claim 1, further comprising storing the first set of interaction data and annotation in computer storage.

6. The method of claim 1, wherein the first identifier is associated with the device and the second identifier is associated with an account.

7. The method of claim 1, wherein the first set of interaction data annotated with a preference for interaction data associated with previous interactions including the first identifier cannot be associated with interaction data associated with previous interactions including the second identifier and wherein the first set of interaction data annotated with a preference for interaction data associated with previous interactions including the second identifier cannot be associated with interaction data associated with previous interactions including the first identifier.

8. The method of claim 1, wherein the second set of interaction data including one or more subsets, each of the one or more subsets associated with a respective one of the one or more previous interactions, the method further comprising analyzing the second set of interaction data using the annotation to determine aggregate statistics associated with the event, wherein the aggregate statistics include a count of the one or more subsets of the second set of interaction data sharing a characteristic with the event.

9. A system for identifying events that share a characteristic, the system comprising: one or more processing circuits comprising one or more processors and one or more memories, the one or more memories having instructions stored thereon that, when executed by the one or more processors, cause the one or more processing circuits to:
  receive, from a device, a first set of interaction data associated with an event, the first set of interaction data including a first identifier and indicating a user interaction with one or more content items;
  identify a second identifier associated with the first identifier;
  identify a second set of interaction data associated with one or more previous interactions, the second set of interaction data including at least one of the first identifier or the second identifier;
  annotate the first set of interaction data based on the one or more previous interactions, wherein the annotation indicates
    (i) a preference for interaction data associated with previous interactions including the first identifier over interaction data associated with previous interactions including the second identifier, such that the interaction data associated with previous interactions including the first identifier are eligible for attribution to the event and the interaction data associated with previous interactions including the second identifier are ineligible for attribution to the event, or
    (ii) a preference for interaction data associated with previous interactions including the second identifier over interaction data associated with previous interactions including the first identifier, such that the interaction data associated with previous interactions including the second identifier are eligible for attribution to the event and interaction data associated with previous interactions including the first identifier are ineligible for attribution to the event;
  determine the event is associated with at least one previous interaction of the one or more previous interactions based on the preference indicated by the annotation, wherein the determining includes analyzing the first set of interaction data and the annotation to attribute the one or more previous interactions to the event, and wherein the analyzing is limited to interaction data, of the second set of interaction data, that includes the preferred identifier indicated by the annotation; and
transmit an indication that the event is associated with the at least one previous interaction.

10. The system of claim 9, wherein the second set of interaction data including one or more subsets, each of the one or more subsets associated with a respective one of the one or more previous interactions, and at least two subsets of the second set of interaction data are associated with a single previous event, wherein a first subset of the at least two subsets includes the first identifier and a second subset of the at least two subsets includes the second identifier, and wherein the first and second subsets of the second set of interaction data are associated with a second device.

11. The system of any of claim 9, wherein annotating the interaction data includes:
  determining whether the second set of interaction data includes the first identifier;
  in response to determining that the second set of interaction data includes the first identifier, annotating the first set of interaction data to prefer interaction data associated with previous interactions including the first identifier;
  in response to determining that the second set of interaction data does not include the first identifier, determining whether the second set of interaction data includes the second identifier; and
  in response to determining that the second set of interaction data includes the second identifier, annotating the first set of interaction data to prefer interaction data associated with previous interactions including the second identifier.

12. The system of claim 9, wherein at least one of the one or more previous interactions is associated with a first device and wherein the event is associated with a second device.

13. The system of claim 9, the one or more processing circuits further configured to store the first set of interaction data and annotation in computer storage.

14. The system of claim 9, wherein the first identifier is associated with the device and the second identifier is associated with an account.

15. The system of claim 9, wherein the first set of interaction data annotated with a preference for interaction data associated with previous interactions including the first identifier cannot be associated with interaction data associated with previous interactions including the second identifier and wherein the first set of interaction data annotated with a preference for interaction data associated with previous interactions including the second identifier cannot be associated with interaction data associated with previous interactions including the first identifier.

16. The system of claim 9, wherein the second set of interaction data including one or more subsets, each of the one or more subsets associated with a respective one of the one or more previous interactions, the one or more processing circuits further configured to analyze the second set of interaction data using the annotation to determine aggregate statistics associated with the event, wherein the aggregate statistics include a count of the one or more subsets of the second set of interaction data sharing a characteristic with the event.

* * * * *

UNITED STATES PATENT AND TRADEMARK OFFICE
CERTIFICATE OF CORRECTION

PATENT NO. : 12,169,494 B2
APPLICATION NO. : 17/413532
DATED : December 17, 2024
INVENTOR(S) : Lianxiao Qui et al.

Page 1 of 1

It is certified that error appears in the above-identified patent and that said Letters Patent is hereby corrected as shown below:

In the Claims

At Column 33, Line 14, "system of any of claim" should be -- system of claim --.

Signed and Sealed this
Twenty-second Day of July, 2025

Coke Morgan Stewart
*Acting Director of the United States Patent and Trademark Office*